US012720584B2

(12) United States Patent
Fan et al.

(10) Patent No.: US 12,720,584 B2
(45) Date of Patent: Aug. 25, 2026

(54) RESOURCE MEASUREMENT METHOD AND COMMUNICATION APPARATUS

(71) Applicant: HUAWEI TECHNOLOGIES CO., LTD., Shenzhen (CN)

(72) Inventors: Bo Fan, Chengdu (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 18/510,687

(22) Filed: Nov. 16, 2023

(65) Prior Publication Data

US 2024/0090008 A1 Mar. 14, 2024

Related U.S. Application Data

(63) Continuation of application No. PCT/CN2022/100293, filed on Jun. 22, 2022.

(30) Foreign Application Priority Data

Jun. 29, 2021 (CN) ......................... 202110730127.9

(51) Int. Cl.
*H04B 17/336* (2015.01)
*H04B 17/318* (2015.01)
*H04W 72/54* (2023.01)

(52) U.S. Cl.
CPC .......... *H04W 72/54* (2023.01); *H04B 17/328* (2023.05); *H04B 17/336* (2015.01)

(58) Field of Classification Search
CPC ............................. H04B 17/336; H04W 72/54
USPC ................................ 370/329, 401, 402, 403
See application file for complete search history.

(56) References Cited

U.S. PATENT DOCUMENTS

| | | | | |
|---|---|---|---|---|
| 12,445,212 | B2 * | 10/2025 | Jin | H04B 17/382 |
| 2019/0059013 | A1 * | 2/2019 | Rahman | H04L 1/00 |
| 2024/0322920 | A1 * | 9/2024 | Jin | H04W 72/541 |

FOREIGN PATENT DOCUMENTS

| | | | |
|---|---|---|---|
| WO | 2021062766 | A1 | 4/2021 |
| WO | 2021073577 | A1 | 4/2021 |
| WO | 2021098048 | A1 | 5/2021 |

* cited by examiner

*Primary Examiner* — Dang T Ton

(57) ABSTRACT

Embodiments of this application disclose a resource measurement method and a communication apparatus, to reduce a measurement delay and reduce measurement and reporting overheads. The method in embodiments of this application includes: A terminal device receives configuration information from a network device, where the configuration information includes M measurement resource sets, each measurement resource set includes one or more measurement resources, and M is an integer greater than or equal to 1. The terminal device measures measurement resources in the M measurement resource sets based on the configuration information, and determines measurement results for K measurement resource sets of the M measurement resource sets, where K is an integer greater than or equal to 1 and less than or equal to M. The terminal device reports the measurement results for the K measurement resource sets to the network device.

20 Claims, 6 Drawing Sheets

Interference measurement resource set 1

Terminal device 3

Terminal device 2

Transmit beam 3

Transmit beam 2

Terminal device 1

Transmit beam 1

First channel measurement resource

Interference measurement resource set 2

Transmit beam 4

Terminal device 4

Transmit beam 5

Network device

Terminal device 5

Figures 4, 5, 6:
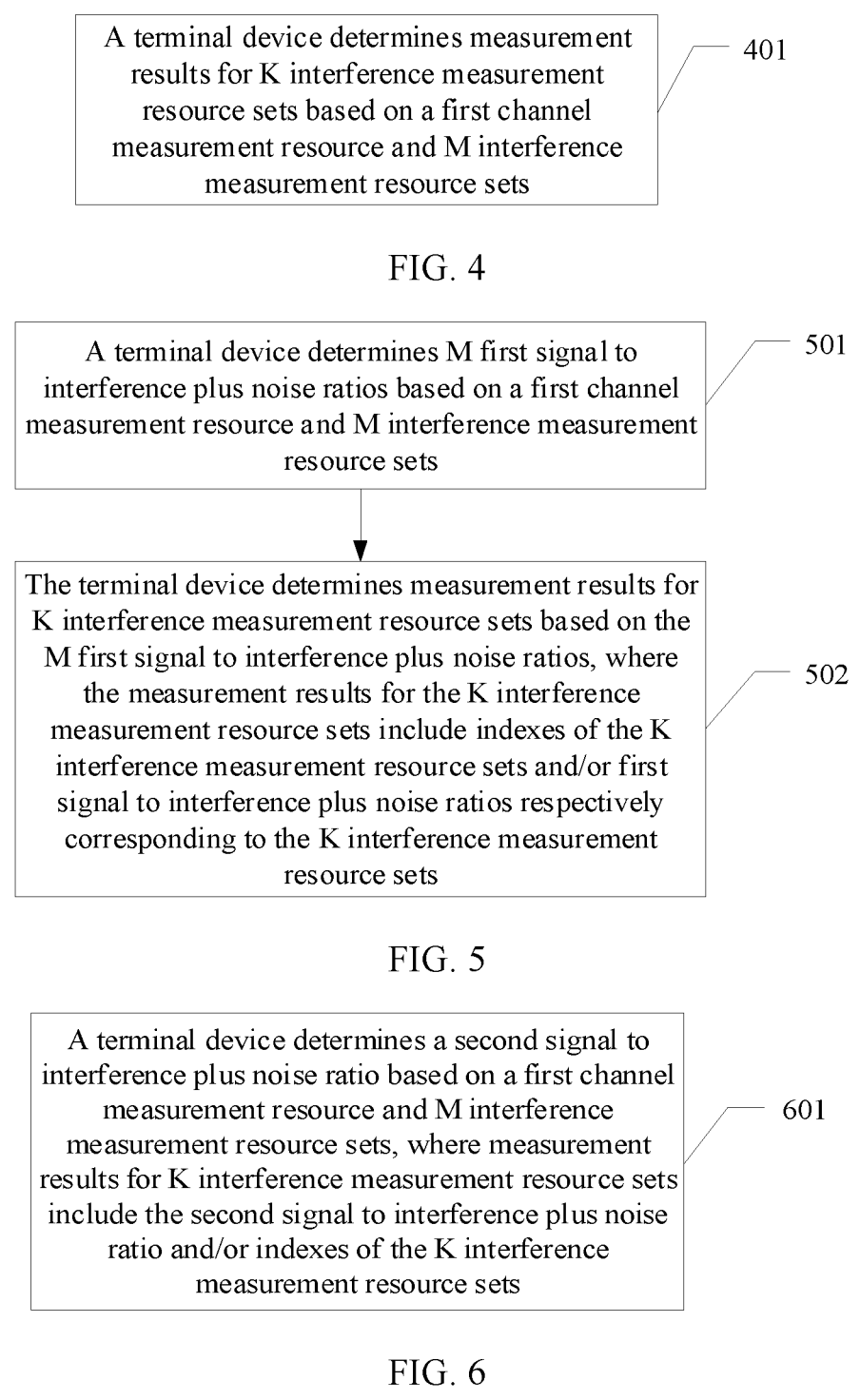

A terminal device determines measurement results for K interference measurement resource sets based on a first channel measurement resource and M interference measurement resource sets

A terminal device determines M first signal to interference plus noise ratios based on a first channel measurement resource and M interference measurement resource sets

501

The terminal device determines measurement results for K interference measurement resource sets based on the M first signal to interference plus noise ratios, where the measurement results for the K interference measurement resource sets include indexes of the K interference measurement resource sets and/or first signal to interference plus noise ratios respectively corresponding to the K interference measurement resource sets

A terminal device determines a second signal to interference plus noise ratio based on a first channel measurement resource and M interference measurement resource sets, where measurement results for K interference measurement resource sets include the second signal to interference plus noise ratio and/or indexes of the K interference measurement resource sets

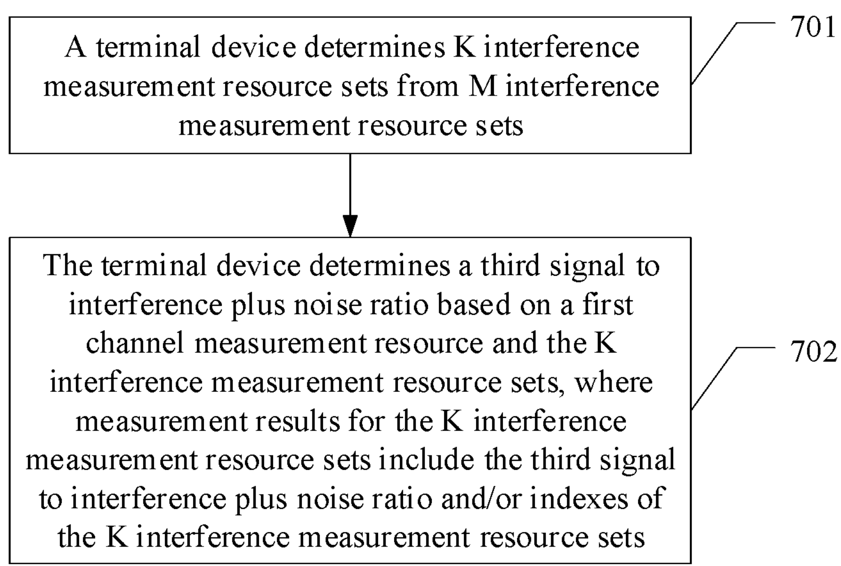
FIG. 7
800
Communication apparatus
Transceiver module 801
Processing module 802
FIG. 8
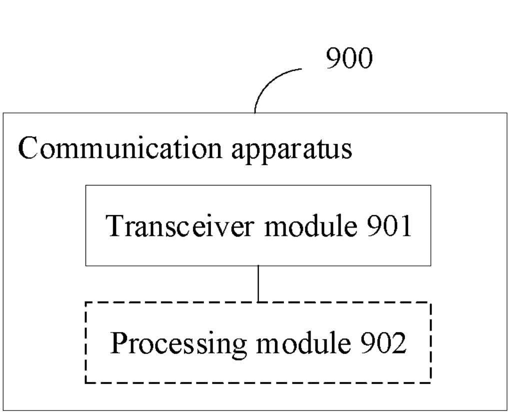
FIG. 9

RESOURCE MEASUREMENT METHOD AND COMMUNICATION APPARATUS

CROSS-REFERENCE TO RELATED APPLICATIONS

This application is a continuation of International Application No. PCT/CN2022/100293, filed on Jun. 22, 2022, which claims priority to Chinese Patent Application No. 202110730127.9, filed on Jun. 29, 2021. The disclosures of the aforementioned applications are hereby incorporated by reference in their entireties.

TECHNICAL FIELD

This application relates to the field of communication technologies, and in particular, to a resource measurement method and a communication apparatus.

BACKGROUND

In a fifth-generation (5G) mobile communication system, a network device communicates with a terminal device at a high frequency. To be specific, data is transmitted between the network device and the terminal device through a signal at an ultra-high frequency band. A main problem in high-frequency communication lies in that signal energy sharply decreases with a transmission distance, leading to a short signal transmission distance. To overcome this problem, an analog beam technology is used in high-frequency communication. Weighting is performed by using a massive antenna array to centralize signal energy within a small range and form a signal similar to a light beam (referred to as an analog beam, beam for short), so as to increase a transmission distance.

A network device may simultaneously transmit data to a plurality of terminal devices through a plurality of analog beams respectively. For example, the network device sends a data signal to a terminal device 1 through an analog beam 1. The network device may configure, for the terminal device, a channel measurement resource corresponding to the analog beam 1. The terminal device measures the channel measurement resource, and reports measurement information for the channel measurement resource to the terminal device.

It can be learned from the foregoing solution that the network device configures, for the terminal device, the channel measurement resource corresponding to the analog beam 1, and can measure only one channel measurement resource at a time. If a plurality of channel measurement resources are measured, measurement and reporting need to be performed a plurality of times. Consequently, a measurement delay is large, and measurement overheads are large.

SUMMARY

This application provides a resource measurement method and a communication apparatus, to reduce a measurement delay and reduce measurement and reporting overheads.

A first aspect of this application provides a resource measurement method. The method includes:

A terminal device receives configuration information from a network device, where the configuration information includes M measurement resource sets, each measurement resource set includes one or more measurement resources, and M is an integer greater than or equal to 1. The terminal device measures measurement resources in the M measurement resource sets based on the configuration information, and determines measurement results for K measurement resource sets of the M measurement resource sets, where K is an integer greater than or equal to 1 and less than or equal to M. The terminal device reports the measurement results for the K measurement resource sets to the network device.

In a possible implementation, the terminal device receives the configuration information from the network device, where the configuration information includes the M measurement resource sets. In a measurement and reporting process, the terminal device may measure the measurement resources in the M measurement resource sets, and report the measurement results for the K measurement resource sets, and the network device may obtain the measurement results for the K measurement resource sets. Measurement or reporting does not need to be performed a plurality of times. This reduces a measurement delay and reduces measurement reporting overheads.

In a possible implementation, that the terminal device determines measurement results for K measurement resource sets of the M measurement resource sets includes: The terminal device determines average signal strength of each of the M measurement resource sets, where the average signal strength of each measurement resource set is an average value of signal strength of all measurement resources included in the measurement resource set. The terminal device determines the measurement results for the K measurement resource sets based on the average signal strength of each of the M measurement resource sets, where the measurement results for the K measurement resource sets include indexes of the K measurement resource sets and/or average signal strength respectively corresponding to the K measurement resource sets.

In this possible implementation, the network device may obtain the measurement results for the K measurement resource sets through one measurement and reporting process performed by the terminal device. To be specific, measurement resources may be grouped, so that the network device can obtain measurement results for more measurement resources with same reporting overheads. Further, if the measurement resources are interference measurement resources, the K measurement resource sets are K interference measurement resource sets. The measurement results for the K measurement resource sets include indexes of the K measurement resource sets and/or average signal strength respectively corresponding to the K measurement resource sets. To be specific, the network device may obtain interference statuses respectively corresponding to the K interference measurement resource sets, so that the network device can properly perform communication and transmission based on the interference statuses, to improve performance of communication and transmission.

In another possible implementation, if at least one of the measurement resources included in the M measurement resource sets includes a plurality of antenna ports, signal strength of the at least one measurement resource is an average value of signal strength corresponding to the plurality of antenna ports; or signal strength of the at least one measurement resource is a sum of signal strength corresponding to the plurality of antenna ports.

The foregoing implementation provides two possible manners of determining signal strength of a measurement resource when the measurement resource includes a plurality of antenna ports. For example, the signal strength of the measurement resource is a sum of signal strength corresponding to the plurality of antenna ports. To be specific, a sum of signal strength of signals sent by the network device on the plurality of antenna ports is used as the signal strength of the measurement resource, to accurately determine the signal strength of the measurement resource.

In another possible implementation, the K measurement resource sets include:

K measurement resource sets with highest average signal strength among the M measurement resource sets;

K measurement resource sets with lowest average signal strength among the M measurement resource sets;

K measurement resource sets whose average signal strength is greater than a first threshold among the M measurement resource sets; or K measurement resource sets whose average signal strength is less than the first threshold among the M measurement resource sets.

It can be learned from the plurality of possible implementations of the K measurement resource sets that the network device may determine interference statuses of the K measurement resource sets. The network device can properly perform communication and transmission based on the measurement results for the K measurement resource sets, to improve performance of communication and transmission. For example, during communication and transmission between the network device performs and the terminal device, the network device does not perform communication or transmission with another terminal device on an interfering beam that causes strong interference to a transmit beam used by the network device to send a signal to the terminal device. This reduces impact on communication and transmission of the terminal device and improves communication quality.

In another possible implementation, the configuration information further includes a first channel measurement resource, the M measurement resource sets are M interference measurement resource sets, each interference measurement resource set includes one or more interference measurement resources, and the measurement results for the K measurement resource sets are measurement results for the K interference measurement resource sets.

That the terminal device determines measurement results for K measurement resource sets of the M measurement resource sets includes:

The terminal device determines the measurement results for the K interference measurement resource sets based on the first channel measurement resource and the M interference measurement resource sets.

In this possible implementation, the network device configures the M interference measurement resource sets for the terminal device, and the M interference measurement resource sets are used to determine statuses of interference caused by the M interference measurement resource sets to the first channel measurement resource. The terminal device determines the measurement results for the K interference measurement resource sets based on the first channel measurement resource and the M interference measurement resource sets. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads.

In another possible implementation, that the terminal device determines the measurement results for the K interference measurement resource sets based on the first channel measurement resource and the M interference measurement resource sets includes:

The terminal device determines M first signal to interference plus noise ratios based on the first channel measurement resource and the M interference measurement resource sets, where the M first signal to interference plus noise ratios correspond to the M interference measurement resource sets, an ith first signal to interference plus noise ratio of the M first signal to interference plus noise ratios is a signal to interference plus noise ratio of the first channel measurement resource that is determined by using an ith interference measurement resource set of the M interference measurement resource sets as interference, and i is an integer greater than or equal to 1 and less than or equal to M. The terminal device determines the measurement results for the K interference measurement resource sets based on the M first signal to interference plus noise ratios, where the measurement results for the K interference measurement resource sets include indexes of the K interference measurement resource sets and/or first signal to interference plus noise ratios respectively corresponding to the K interference measurement resource sets.

In this possible implementation, the terminal device determines the M first signal to interference plus noise ratios based on the first channel measurement resource and the M interference measurement resource sets, and the terminal device determines the measurement results for the K interference measurement resource sets based on the M first signal to interference plus noise ratios. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads. Further, the measurement results for the K interference measurement resource sets include the indexes of the K interference measurement resource sets and/or the first signal to interference plus noise ratios respectively corresponding to the K interference measurement resource sets. The network device may determine interference statuses of the K interference measurement resource sets, and properly perform communication and transmission, to improve performance of communication and transmission. For example, during communication and transmission between the network device performs and the terminal device, the network device does not perform communication or transmission with another terminal device on an interfering beam that causes strong interference to a transmit beam used by the network device to send a signal to the terminal device. This reduces impact on communication and transmission of the terminal device and improves communication quality.

In another possible implementation, the ith first signal to interference plus noise ratio is a signal to interference plus noise ratio of the first channel measurement resource that is determined by using average signal strength of the ith interference measurement resource set as interference; and the average signal strength of the ith interference measurement resource set is an average value of signal strength of all interference measurement resources included in the ith interference measurement resource set.

In this possible implementation, each of the M first signal to interference plus noise ratios is a signal to interference plus noise ratio of the first channel measurement resource that is determined by using average signal strength of each of the M interference measurement resource sets as interference. In this way, a first signal to interference plus noise ratio corresponding to each interference measurement resource can represent a status of interference caused by the interference measurement resource to the first channel measurement resource, and the network device can properly perform communication and transmission. For example, during communication and transmission between the network device performs and the terminal device, the network device does not perform communication or transmission with another terminal device on an interfering beam that causes strong interference to a transmit beam used by the network device to send a signal to the terminal device. This reduces impact on communication and transmission of the terminal device and improves communication quality.

In another possible implementation, if at least one of the interference measurement resources included in the ith interference measurement resource set includes a plurality of antenna ports, signal strength of the at least one interference measurement resource is an average value of signal strength corresponding to the plurality of antenna ports; or signal strength of the at least one interference measurement resource is a sum of signal strength corresponding to the plurality of antenna ports.

The foregoing implementation provides two possible manners of determining signal strength of an interference measurement resource when the interference measurement resource includes a plurality of antenna ports. For example, the signal strength of the interference measurement resource is a sum of signal strength corresponding to the plurality of antenna ports. To be specific, a sum of signal strength of signals sent by the network device on the plurality of antenna ports is used as the signal strength of the interference measurement resource set, to accurately determine the signal strength of the interference measurement resource.

In another possible implementation, the K interference measurement resource sets include:

K interference measurement resource sets corresponding to a largest first signal to interference plus noise ratio among the M interference measurement resource sets;

K interference measurement resource sets corresponding to a smallest first signal to interference plus noise ratio among the M interference measurement resource sets;

an interference measurement resource set corresponding to a first signal to interference plus noise ratio greater than a second threshold among the M interference measurement resource sets; or an interference measurement resource set corresponding to a first signal to interference plus noise ratio less than the second threshold among the M interference measurement resource sets.

It can be learned from the foregoing implementation of the K interference measurement resources that the terminal device reports, to the network device, measurement results for the K interference measurement resource sets with the largest or smallest first signal to interference plus noise ratio, or the terminal device reports, to the network device, measurement results for K interference measurement resource sets whose first signal to interference plus noise ratios are greater than the second threshold or less than the second threshold. In this way, during communication and transmission between the network device performs and the terminal device, the network device can avoid performing communication and transmission with another terminal device on an interfering beam that causes strong interference to the terminal device. This improves performance of communication and transmission.

In another possible implementation, K is equal to M, the K interference measurement resource sets are the M interference measurement resource sets, and that the terminal device determines the measurement results for the K interference measurement resource sets based on the first channel measurement resource and the M interference measurement resource sets includes:

The terminal device determines a second signal to interference plus noise ratio based on the first channel measurement resource and the M interference measurement resource sets, where the second signal to interference plus noise ratio is a signal to interference plus noise ratio of the first channel measurement resource that is determined by using the M interference measurement resource sets as interference, and the measurement results for the K interference measurement resource sets include the second signal to interference plus noise ratio and/or indexes of the K interference measurement resource sets.

In the foregoing implementation, the terminal device determines the second signal to interference plus noise ratio based on the first channel measurement resource and the M interference measurement resource sets. The second signal to interference plus noise ratio is a signal to interference plus noise ratio of the first channel measurement resource that is determined by using the M interference measurement resource sets as interference. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads. The network device may obtain the second signal to interference plus noise ratio, so that the network device can select a correct modulation and coding parameter to perform data transmission with the terminal device.

In another possible implementation, that the terminal device determines a second signal to interference plus noise ratio based on the first channel measurement resource and the M interference measurement resource sets includes:

The terminal device determines the second signal to interference plus noise ratio based on signal strength of the first channel measurement resource and average signal strength respectively corresponding to the M interference measurement resource sets, where average signal strength of each of the M interference measurement resource sets is an average value of signal strength of all interference measurement resources included in the interference measurement resource set.

In this possible implementation, the second signal to interference plus noise ratio is a signal to interference plus noise ratio of the first channel measurement resource that is calculated by using the average signal strength respectively corresponding to the M interference measurement resource sets as interference. In this way, based on statuses of interference caused by the M interference measurement resource sets to the first channel resource, the network device can determine degrees of interference caused by the M interference measurement resource sets to the first channel measurement resource. The network device obtains the second signal to interference plus noise ratio, so that the network device can select a correct modulation and coding parameter to perform data transmission with the terminal device.

In another possible implementation, that the terminal device determines the second signal to interference plus noise ratio based on signal strength of the first channel measurement resource and average signal strength respectively corresponding to the M interference measurement resource sets includes:

The terminal device determines the second signal to interference plus noise ratio based on the signal strength of the first channel measurement resource and first interference signal strength, where the first interference signal strength is a sum of the average signal strength respectively corresponding to the M interference measurement resource sets, or the first interference signal strength is an average value of the average signal strength respectively corresponding to the M interference measurement resource sets.

The foregoing implementation provides two possible implementations of determining the second signal to interference plus noise ratio by the terminal device, so that the terminal device can accurately determine the second signal to interference plus noise ratio, to represent the degrees of interference caused by the M interference measurement resource sets to the first channel measurement resource. In this way, the network device can select a correct modulation and coding parameter to perform data transmission with the terminal device.

In another possible implementation, K is less than M, and the M interference measurement resource sets include the K interference measurement resource sets.

That the terminal device determines the measurement results for the K interference measurement resource sets based on the first channel measurement resource and the M interference measurement resource sets includes:

The terminal device determines the K interference measurement resource sets from the M interference signal resource sets. The terminal device determines a third signal to interference plus noise ratio based on the first channel measurement resource and the K interference measurement resource sets, where the third signal to interference plus noise ratio is a signal to interference plus noise ratio of the first channel measurement resource that is determined by using the K interference measurement resource sets as interference, and the measurement results for the K interference measurement resource sets include the third signal to interference plus noise ratio and/or indexes of the K interference measurement resource sets.

In the foregoing technical solution, the terminal device determines the third signal to interference plus noise ratio based on the first channel measurement resource and the M interference measurement resource sets. The third signal to interference plus noise ratio is a signal to interference plus noise ratio of the first channel measurement resource that is determined by using the K interference measurement resource sets as interference. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads. The network device may determine, based on the measurement results for the K measurement resource sets, statuses of interference caused by the K measurement resource sets to the first channel measurement resource. During communication and transmission between the network device performs and the terminal device, the network device can avoid performing communication and transmission with another terminal device on an interfering beam that causes strong interference to the terminal device. This improves performance of communication and transmission. Further, the network device may obtain the third signal to interference plus noise ratio, so that the network device can select a correct modulation and coding parameter to perform data transmission with the terminal device.

In another possible implementation, that the terminal device determines the K interference measurement resource sets from the M interference signal resource sets includes:

The terminal device receives indication information from the network device, where the indication information indicates the K interference measurement resource sets.

In this possible implementation, the terminal device may determine the K interference measurement resource sets based on the indication information of the network device. The K interference measurement resource sets may be interference measurement resource sets that are preliminarily determined by the network device and that cause strong or weak interference to the first channel measurement resource.

In another possible implementation, the method further includes: The terminal device determines average signal strength of each of the M interference measurement resource sets, where the average signal strength of each interference measurement resource set is an average value of signal strength of all interference measurement resources included in the interference measurement resource set.

That the terminal device determines the K interference measurement resource sets from the M interference signal resource sets includes:

The terminal device determines the K interference measurement resource sets based on the average signal strength of each of the M interference measurement resource sets.

In this possible implementation, the terminal device may select, based on the average signal strength of each interference measurement resource set, K interference measurement resource sets that can reflect a degree of interference to the first channel measurement resource. In this way, the terminal device can determine the third signal to interference plus noise ratio based on the K interference measurement resource sets, so that the network device can select a correct modulation and coding parameter to perform data transmission with the terminal device.

In another possible implementation, that the terminal device determines a third signal to interference plus noise ratio based on the first channel measurement resource and the K interference measurement resource sets includes:

The terminal device determines the third signal to interference plus noise ratio based on signal strength of the first channel measurement resource and average signal strength respectively corresponding to the K interference measurement resource sets, where average signal strength of each of the K interference measurement resource sets is an average value of signal strength of all interference measurement resources included in the interference measurement resource set.

In this possible implementation, the terminal device determines the third signal to interference plus noise ratio based on the signal strength of the first channel measurement resource and the average signal strength respectively corresponding to the K interference measurement resource sets. In this way, the network device can obtain the third signal to interference plus noise ratio, so that the network device can select a correct modulation and coding parameter to perform data transmission with the terminal device.

In another possible implementation, that the terminal device determines the third signal to interference plus noise ratio based on signal strength of the first channel measurement resource and average signal strength respectively corresponding to the K interference measurement resource sets includes:

The terminal device determines the third signal to interference plus noise ratio based on the signal strength of the first channel measurement resource and second interference signal strength, where the second interference signal strength is a sum of the average signal strength respectively corresponding to the K interference measurement resource sets, or the second interference signal strength is an average value of the average signal strength respectively corresponding to the K interference measurement resource sets.

The foregoing implementation provides two possible implementations of determining the third signal to interference plus noise ratio by the terminal device, so that the terminal device can accurately determine the third signal to interference plus noise ratio, to represent degrees of interference caused by the K interference measurement resource sets to the first channel measurement resource. In this way, the network device can select a correct modulation and coding parameter to perform data transmission with the terminal device.

In another possible implementation, all interference measurement resources in a same interference measurement resource set of the K interference measurement resource sets each include a same quantity of antenna ports.

In this possible implementation, all interference measurement resources in a same interference measurement resource set of the K interference measurement resource sets each include a same quantity of antenna ports, so that the terminal device can quickly determine average signal strength of the interference measurement resource set.

In another possible implementation, the method further includes: The terminal device reports capability information to the network device, where the capability information includes at least one of the following: a quantity of measurement resource sets supported by the terminal device, a quantity of resources included in a measurement resource set supported by the terminal device, or a total quantity of resources included in a plurality of measurement resource sets supported by the terminal device.

In the foregoing implementation, the terminal device sends the capability information to the network device, so that the network device can configure the M measurement resource sets for the terminal device based on the capability information. This facilitates correct implementation of the solution.

A second aspect of this application provides a resource measurement method. The method includes:

A network device sends configuration information to a terminal device, where the configuration information includes M measurement resource sets, each measurement resource set includes one or more measurement resources, and M is an integer greater than or equal to 1. The network device receives measurement results for K measurement resource sets of the M measurement resource sets from the terminal device, where the measurement results for the K measurement resource sets are determined by the terminal device based on the configuration information, and K is an integer greater than or equal to 1 and less than or equal to M.

In the foregoing technical solution, the network device sends the configuration information to the terminal device, where the configuration information includes the M measurement resource sets. In one measurement and reporting process, the terminal device may measure measurement resources in the M measurement resource sets, and report the measurement results for the K measurement resource sets, and the network device may obtain the measurement results for the K measurement resource sets. Measurement or reporting does not need to be performed a plurality of times. This reduces a measurement delay and reduces measurement reporting overheads.

In a possible implementation, the measurement results for the K measurement resource sets include indexes of the K measurement resource sets and/or average signal strength respectively corresponding to the K measurement resource sets; and average signal strength of each of the K measurement resource sets is an average value of signal strength of all measurement resources included in the measurement resource set.

In this possible implementation, the network device can obtain the measurement results for the K measurement resource sets through one measurement and reporting process performed by the terminal device. To be specific, in the foregoing implementation, measurement resources are grouped, so that the network device can obtain measurement results for more measurement resources with same reporting overheads. Further, if the measurement resources are interference measurement resources, the K measurement resource sets are K interference measurement resource sets. The measurement results for the K measurement resource sets include the indexes of the K measurement resource sets and/or the average signal strength respectively corresponding to the K measurement resource sets. To be specific, the network device may obtain interference statuses respectively corresponding to the K interference measurement resource sets, so that the network device can properly perform communication and transmission based on the interference statuses, to improve performance of communication and transmission.

In another possible implementation, if at least one of the measurement resources included in the M measurement resource sets includes a plurality of antenna ports, signal strength of the at least one measurement resource is an average value of signal strength corresponding to the plurality of antenna ports; or signal strength of the at least one measurement resource is a sum of signal strength corresponding to the plurality of antenna ports.

The foregoing implementation provides two possible manners of determining signal strength of a measurement resource when the measurement resource includes a plurality of antenna ports. For example, the signal strength of the measurement resource is a sum of signal strength corresponding to the plurality of antenna ports. To be specific, a sum of signal strength of signals sent by the network device on the plurality of antenna ports is used as the signal strength of the measurement resource, to accurately determine the signal strength of the measurement resource.

In another possible implementation, the K measurement resource sets include:

K measurement resource sets with highest average signal strength among the M measurement resource sets;

K measurement resource sets with lowest average signal strength among the M measurement resource sets;

K measurement resource sets whose average signal strength is greater than a first threshold among the M measurement resource sets; or K measurement resource sets whose average signal strength is less than the first threshold among the M measurement resource sets.

It can be learned from the plurality of possible implementations of the K measurement resource sets that the network device may determine interference statuses of the K measurement resource sets. The network device can properly perform communication and transmission based on the measurement results for the K measurement resource sets, to improve performance of communication and transmission. For example, during communication and transmission between the network device performs and the terminal device, the network device does not perform communication or transmission with another terminal device on an interfering beam that causes strong interference to a transmit beam used by the network device to send a signal to the terminal device. This reduces impact on communication and transmission of the terminal device and improves communication quality.

In another possible implementation, the configuration information further includes a first channel measurement resource, the M measurement resource sets are M interference measurement resource sets, each interference measurement resource set includes one or more interference measurement resources, and the measurement results for the K measurement resource sets are measurement results for the K interference measurement resource sets;

the measurement results for the K interference measurement resource sets include first signal to interference plus noise ratios respectively corresponding to the K interference measurement resource sets and/or indexes of the K interference measurement resource sets; and a first signal to interference plus noise ratio corresponding to each of the K interference measurement resource sets is a signal to interference plus noise ratio of the first channel measurement resource that is determined by using each interference measurement resource set as interference.

In this possible implementation, the network device configures the M interference measurement resource sets for the terminal device, and the M interference measurement resource sets are used to determine statuses of interference caused by the M interference measurement resource sets to the first channel measurement resource. The terminal device determines the measurement results for the K interference measurement resource sets based on the first channel measurement resource and the M interference measurement resource sets. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads. Further, the measurement results for the K interference measurement resource sets include the indexes of the K interference measurement resource sets and/or the first signal to interference plus noise ratios respectively corresponding to the K interference measurement resource sets. The network device may determine interference statuses of the K interference measurement resource sets, and properly perform communication and transmission, to improve performance of communication and transmission. For example, during communication and transmission between the network device performs and the terminal device, the network device does not perform communication or transmission with another terminal device on an interfering beam that causes strong interference to a transmit beam used by the network device to send a signal to the terminal device. This reduces impact on communication and transmission of the terminal device and improves communication quality.

In another possible implementation, the first signal to interference plus noise ratio corresponding to each of the K interference measurement resource sets is a signal to interference plus noise ratio of the first channel measurement resource that is determined by using average signal strength of the interference measurement resource set as interference; and the average signal strength of each interference measurement resource set is an average value of signal strength of all interference measurement resources included in the interference measurement resource set.

In this possible implementation, the first signal to interference plus noise ratio corresponding to each interference measurement resource set is a signal to interference plus noise ratio of the first channel measurement resource that is determined by using the average signal strength of each interference measurement resource set as interference. In this way, the first signal to interference plus noise ratio corresponding to each interference measurement resource set can represent a status of interference caused by the interference measurement resource set to the first channel measurement resource, so that the network device can properly perform communication and transmission. For example, during communication and transmission between the network device performs and the terminal device, the network device does not perform communication or transmission with another terminal device on an interfering beam that causes strong interference to a transmit beam used by the network device to send a signal to the terminal device. This reduces impact on communication and transmission of the terminal device and improves communication quality.

In another possible implementation, the K interference measurement resource sets include:

K interference measurement resource sets corresponding to a largest first signal to interference plus noise ratio among the M interference measurement resource sets;

K interference measurement resource sets corresponding to a smallest first signal to interference plus noise ratio among the M interference measurement resource sets;

an interference measurement resource set corresponding to a first signal to interference plus noise ratio greater than a second threshold among the M interference measurement resource sets; or an interference measurement resource set corresponding to a first signal to interference plus noise ratio less than the second threshold among the M interference measurement resource sets.

It can be learned from the foregoing implementation of the K interference measurement resources that the terminal device reports, to the network device, measurement results for the K interference measurement resource sets with the largest or smallest first signal to interference plus noise ratio, or the terminal device reports, to the network device, measurement results for K interference measurement resource sets whose first signal to interference plus noise ratios are greater than the second threshold or less than the second threshold. In this way, during communication and transmission between the network device performs and the terminal device, the network device can avoid performing communication and transmission with another terminal device on an interfering beam that causes strong interference to the terminal device. This improves performance of communication and transmission.

In another possible implementation, the configuration information further includes a first channel measurement resource, the M measurement resource sets are M interference measurement resource sets, each interference measurement resource set includes one or more interference measurement resources, and the measurement results for the K measurement resource sets are measurement results for the K interference measurement resource sets; and the measurement results for the K interference measurement resource sets include the second signal to interference plus noise ratio and/or indexes of the K interference measurement resource sets, where the second signal to interference plus noise ratio is a signal to interference plus noise ratio of the first channel measurement resource that is determined by using the K interference measurement resource sets as interference.

In the foregoing implementation, the second signal to interference plus noise ratio is a signal to interference plus noise ratio of the first channel measurement resource that is determined by using the K interference measurement resource sets as interference. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads. The network device may obtain the second signal to interference plus noise ratio, so that the network device can select a correct modulation and coding parameter to perform data transmission with the terminal device.

In another possible implementation, the second signal to interference plus noise ratio is a signal to interference plus noise ratio of the first channel measurement resource that is determined by using average signal strength respectively corresponding to the K interference measurement resource sets as interference; and average signal strength of each of the K interference measurement resource sets is an average value of signal strength of all interference measurement resources included in the interference measurement resource set.

In this possible implementation, the second signal to interference plus noise ratio is a signal to interference plus noise ratio of the first channel measurement resource that is determined by using the average signal strength respectively corresponding to the K interference measurement resource sets as interference. The network device obtains the second signal to interference plus noise ratio, so that the network device can select a correct modulation and coding parameter to perform data transmission with the terminal device.

In another possible implementation, the second signal to interference plus noise ratio is a signal to interference plus noise ratio of the first channel measurement resource that is determined by using a sum of the average signal strength respectively corresponding to the K interference measurement resource sets as interference; or the second signal to interference plus noise ratio is a signal to interference plus noise ratio of the first channel measurement resource that is determined by using an average value of the average signal strength respectively corresponding to the K interference measurement resource sets as interference; and average signal strength of each of the K interference measurement resource sets is an average value of signal strength of all interference measurement resources included in the interference measurement resource set.

The foregoing implementation provides two possible implementations of determining the third signal to interference plus noise ratio, so that the terminal device can accurately determine the third signal to interference plus noise ratio, to represent degrees of interference caused by the K interference measurement resource sets to the first channel measurement resource. In this way, the network device can select a correct modulation and coding parameter to perform data transmission with the terminal device.

In another possible implementation, the method further includes:

The network device sends indication information to the terminal device, where the indication information indicates the K interference measurement resource sets.

In this possible implementation, the network device indicates the K interference measurement resource sets to the terminal device by using the indication information. The K interference measurement resource sets may be interference measurement resource sets that are preliminarily determined by the network device and that cause strong or weak interference to the first channel measurement resource.

In another possible implementation, the method further includes:

The network device receives capability information sent by the terminal device, where the capability information includes at least one of the following: a quantity of measurement resource sets supported by the terminal device, a quantity of resources included in a measurement resource set supported by the terminal device, or a total quantity of resources included in a plurality of measurement resource sets supported by the terminal device.

In the foregoing implementation, the network device receives the capability information sent by the terminal device, so that the network device can configure the M measurement resource sets for the terminal device based on the capability information. This facilitates correct implementation of the solution.

A third aspect of this application provides a communication apparatus, including:

a transceiver module, configured to receive configuration information from a network device, where the configuration information includes M measurement resource sets, each measurement resource set includes one or more measurement resources, and M is an integer greater than or equal to 1; and a processing module, configured to measure measurement resources in the M measurement resource sets based on the configuration information, and determine measurement results for K measurement resource sets of the M measurement resource sets, where K is an integer greater than or equal to 1 and less than or equal to M, where the transceiver module is further configured to report the measurement results for the K measurement resource sets to the network device.

In a possible implementation, the processing module is configured to:

determine average signal strength of each of the M measurement resource sets, where the average signal strength of each measurement resource set is an average value of signal strength of all measurement resources included in the measurement resource set; and determine the measurement results for the K measurement resource sets based on the average signal strength of each of the M measurement resource sets, where the measurement results for the K measurement resource sets include indexes of the K measurement resource sets and/or average signal strength respectively corresponding to the K measurement resource sets.

In another possible implementation, if at least one of the measurement resources included in the M measurement resource sets includes a plurality of antenna ports, signal strength of the at least one measurement resource is an average value of signal strength corresponding to the plurality of antenna ports; or signal strength of the at least one measurement resource is a sum of signal strength corresponding to the plurality of antenna ports.

In another possible implementation, the K measurement resource sets include:

K measurement resource sets with highest average signal strength among the M measurement resource sets;

K measurement resource sets with lowest average signal strength among the M measurement resource sets;

K measurement resource sets whose average signal strength is greater than a first threshold among the M measurement resource sets; or K measurement resource sets whose average signal strength is less than the first threshold among the M measurement resource sets.

In another possible implementation, the configuration information further includes a first channel measurement resource, the M measurement resource sets are M interference measurement resource sets, each interference measurement resource set includes one or more interference measurement resources, and the measurement results for the K measurement resource sets are measurement results for the K interference measurement resource sets; and the processing module is configured to:

determine the measurement results for the K interference measurement resource sets based on the first channel measurement resource and the M interference measurement resource sets.

In another possible implementation, the processing module is configured to:

determine M first signal to interference plus noise ratios based on the first channel measurement resource and the M interference measurement resource sets, where the M first signal to interference plus noise ratios correspond to the M interference measurement resource sets, an ith first signal to interference plus noise ratio of the M first signal to interference plus noise ratios is a signal to interference plus noise ratio of the first channel measurement resource that is determined by using an ith interference measurement resource set of the M interference measurement resource sets as interference, and i is an integer greater than or equal to 1 and less than or equal to M; and determine the measurement results for the K interference measurement resource sets based on the M first signal to interference plus noise ratios, where the measurement results for the K interference measurement resource sets include indexes of the K interference measurement resource sets and/or first signal to interference plus noise ratios respectively corresponding to the K interference measurement resource sets.

In another possible implementation, the ith first signal to interference plus noise ratio is a signal to interference plus noise ratio of the first channel measurement resource that is determined by using average signal strength of the ith interference measurement resource set as interference; and the average signal strength of the ith interference measurement resource set is an average value of signal strength of all interference measurement resources included in the ith interference measurement resource set.

In another possible implementation, if at least one of the interference measurement resources included in the ith interference measurement resource set includes a plurality of antenna ports, signal strength of the at least one interference measurement resource is an average value of signal strength corresponding to the plurality of antenna ports; or signal strength of the at least one interference measurement resource is a sum of signal strength corresponding to the plurality of antenna ports.

In another possible implementation, the K interference measurement resource sets include:

K interference measurement resource sets corresponding to a largest first signal to interference plus noise ratio among the M interference measurement resource sets;

K interference measurement resource sets corresponding to a smallest first signal to interference plus noise ratio among the M interference measurement resource sets;

an interference measurement resource set corresponding to a first signal to interference plus noise ratio greater than a second threshold among the M interference measurement resource sets; or an interference measurement resource set corresponding to a first signal to interference plus noise ratio less than the second threshold among the M interference measurement resource sets.

In another possible implementation, K is equal to M, the K interference measurement resource sets are the M interference measurement resource sets, and the processing module is configured to:

determine a second signal to interference plus noise ratio based on the first channel measurement resource and the M interference measurement resource sets, where the second signal to interference plus noise ratio is a signal to interference plus noise ratio of the first channel measurement resource that is determined by using the M interference measurement resource sets as interference, and the measurement results for the K interference measurement resource sets include the second signal to interference plus noise ratio and/or indexes of the M interference measurement resource sets.

In another possible implementation, the processing module is configured to:

determine the second signal to interference plus noise ratio based on signal strength of the first channel measurement resource and average signal strength respectively corresponding to the M interference measurement resource sets, where average signal strength of each of the M interference measurement resource sets is an average value of signal strength of all interference measurement resources included in the interference measurement resource set.

In another possible implementation, the processing module is configured to:

determine the second signal to interference plus noise ratio based on the signal strength of the first channel measurement resource and first interference signal strength, where the first interference signal strength is a sum of the average signal strength respectively corresponding to the M interference measurement resource sets, or the first interference signal strength is an average value of the average signal strength respectively corresponding to the M interference measurement resource sets.

In another possible implementation, K is less than M, and the M interference measurement resource sets include the K interference measurement resource sets; and the processing module is configured to:

determine the K interference measurement resource sets from the M interference signal resource sets; and determine a third signal to interference plus noise ratio based on the first channel measurement resource and the K interference measurement resource sets, where the third signal to interference plus noise ratio is a signal to interference plus noise ratio of the first channel measurement resource that is determined by using the K interference measurement resource sets as interference, and the measurement results for the K interference measurement resource sets include the third signal to interference plus noise ratio and/or indexes of the K interference measurement resource sets.

In another possible implementation, the processing module is configured to:

receive indication information from the network device, where the indication information indicates the K interference measurement resource sets.

In another possible implementation, the processing module is configured to:

determine average signal strength of each of the M interference measurement resource sets, where the average signal strength of each interference measurement resource set is an average value of signal strength of all interference measurement resources included in the interference measurement resource set; and determine the K interference measurement resource sets based on the average signal strength of each of the M interference measurement resource sets.

In another possible implementation, the processing module is configured to:

determine the third signal to interference plus noise ratio based on signal strength of the first channel measurement resource and average signal strength respectively corresponding to the K interference measurement resource sets, where average signal strength of each of the K interference measurement resource sets is an average value of signal strength of all interference measurement resources included in the interference measurement resource set.

In another possible implementation, the processing module is configured to:

determine the third signal to interference plus noise ratio based on the signal strength of the first channel measurement resource and second interference signal strength, where the second interference signal strength is a sum of the average signal strength respectively corresponding to the K interference measurement resource sets, or the second interference signal strength is an average value of the average signal strength respectively corresponding to the K interference measurement resource sets.

In another possible implementation, all interference measurement resources in a same interference measurement resource set of the K interference measurement resource sets each include a same quantity of antenna ports.

In another possible implementation, the transceiver module is further configured to:

report capability information to the network device, where the capability information includes at least one of the following: a quantity of measurement resource sets supported by the communication apparatus, a quantity of resources included in a measurement resource set supported by the communication apparatus, or a total quantity of resources included in a plurality of measurement resource sets supported by the communication apparatus.

A fourth aspect of this application further provides a communication apparatus, including:

a transceiver module, configured to: send configuration information to a terminal device, where the configuration information includes M measurement resource sets, each measurement resource set includes one or more measurement resources, and M is an integer greater than or equal to 1; and receive measurement results for K measurement resource sets of the M measurement resource sets from the terminal device, where the measurement results for the K measurement resource sets are determined by the terminal device based on the configuration information, and K is an integer greater than or equal to 1 and less than or equal to M.

In a possible implementation, the measurement results for the K measurement resource sets include indexes of the K measurement resource sets and/or average signal strength of the K measurement resource sets; and average signal strength of each of the K measurement resource sets is an average value of signal strength of all measurement resources included in the measurement resource set.

In another possible implementation, if at least one of the measurement resources included in the M measurement resource sets includes a plurality of antenna ports, signal strength of the at least one measurement resource is an average value of signal strength corresponding to the plurality of antenna ports; or signal strength of the at least one measurement resource is a sum of signal strength corresponding to the plurality of antenna ports.

In another possible implementation, the K measurement resource sets include:

K measurement resource sets with highest average signal strength among the M measurement resource sets;

K measurement resource sets with lowest average signal strength among the M measurement resource sets;

K measurement resource sets whose average signal strength is greater than a first threshold among the M measurement resource sets; or K measurement resource sets whose average signal strength is less than the first threshold among the M measurement resource sets.

In another possible implementation, the configuration information further includes a first channel measurement resource, the M measurement resource sets are M interference measurement resource sets, each interference measurement resource set includes one or more interference measurement resources, and the measurement results for the K measurement resource sets are measurement results for the K interference measurement resource sets;

the measurement results for the K interference measurement resource sets include first signal to interference plus noise ratios respectively corresponding to the K interference measurement resource sets and/or indexes of the K interference measurement resource sets; and a first signal to interference plus noise ratio corresponding to each of the K interference measurement resource sets is a signal to interference plus noise ratio of the first channel measurement resource that is determined by using each interference measurement resource set as interference.

In another possible implementation, the first signal to interference plus noise ratio of each of the K interference measurement resource sets is a signal to interference plus noise ratio of the first channel measurement resource that is determined by using average signal strength of the interference measurement resource set as interference; and the average signal strength of each interference measurement resource set is an average value of signal strength of all interference measurement resources included in the interference measurement resource set.

In another possible implementation, the K interference measurement resource sets include:

K interference measurement resource sets corresponding to a largest first signal to interference plus noise ratio among the M interference measurement resource sets;

K interference measurement resource sets corresponding to a smallest first signal to interference plus noise ratio among the M interference measurement resource sets;

an interference measurement resource set corresponding to a first signal to interference plus noise ratio greater than a second threshold among the M interference measurement resource sets; or an interference measurement resource set corresponding to a first signal to interference plus noise ratio less than the second threshold among the M interference measurement resource sets.

In another possible implementation, the configuration information further includes a first channel measurement resource, the M measurement resource sets are M interference measurement resource sets, each interference measurement resource set includes one or more interference measurement resources, and the measurement results for the K measurement resource sets are measurement results for the K interference measurement resource sets; and the measurement results for the K interference measurement resource sets include the second signal to interference plus noise ratio and/or indexes of the K interference measurement resource sets, where the second signal to interference plus noise ratio is a signal to interference plus noise ratio of the first channel measurement resource that is determined by using the K interference measurement resource sets as interference.

In another possible implementation, the second signal to interference plus noise ratio is a signal to interference plus noise ratio of the first channel measurement resource that is determined by using average signal strength respectively corresponding to the K interference measurement resource sets as interference; and average signal strength of each of the K interference measurement resource sets is an average value of signal strength of all interference measurement resources included in the interference measurement resource set.

In another possible implementation, the second signal to interference plus noise ratio is a signal to interference plus noise ratio of the first channel measurement resource that is determined by using a sum of the average signal strength respectively corresponding to the K interference measurement resource sets as interference; or the second signal to interference plus noise ratio is a signal to interference plus noise ratio of the first channel measurement resource that is determined by using an average value of the average signal strength respectively corresponding to the K interference measurement resource sets as interference; and average signal strength of each of the K interference measurement resource sets is an average value of signal strength of all interference measurement resources included in the interference measurement resource set.

In another possible implementation, the transceiver module is further configured to:

send indication information to the terminal device, where the indication information indicates the K interference measurement resource sets.

In another possible implementation, the transceiver module is further configured to:

receive capability information sent by the terminal device, where the capability information includes at least one of the following: a quantity of measurement resource sets supported by the terminal device, a quantity of resources included in a measurement resource set supported by the terminal device, or a total quantity of resources included in a plurality of measurement resource sets supported by the terminal device.

A fifth aspect of this application provides a communication apparatus. The communication apparatus includes a processor and a memory. The memory stores a computer program or computer instructions. The processor is configured to invoke and run the computer program or the computer instructions stored in the memory, so that the processor implements any one of the implementations of the first aspect or the second aspect.

Optionally, the communication apparatus further includes a transceiver, and the processor is configured to control the transceiver to send or receive a signal.

A sixth aspect of this application provides a communication apparatus. The communication apparatus includes a processor. The processor is configured to invoke a computer program or computer instructions in a memory, so that the processor implements any one of the implementations of the first aspect or the second aspect; or the processor is configured to perform any one of the implementations of the first aspect or the second aspect.

Optionally, the communication apparatus further includes a transceiver, and the processor is configured to control the transceiver to send or receive a signal.

A seventh aspect of this application provides a computer program product including instructions. When the computer program product runs on a computer, the computer is enabled to perform any one of the implementations of the first aspect or the second aspect.

An eighth aspect of this application provides a computer-readable storage medium, including computer instructions. When the instructions run on a computer, the computer is enabled to perform any one of the implementations of the first aspect or the second aspect.

A ninth aspect of this application provides a chip apparatus, including a processor, configured to invoke a computer program or computer instructions in a memory, so that the processor performs any one of the implementations of the first aspect or the second aspect.

Optionally, the processor is coupled to the memory through an interface.

A tenth aspect of this application provides a communication system. The communication system includes the terminal device according to the first aspect and the network device according to the second aspect.

It can be learned from the foregoing technical solutions that the technical solutions of this application have the following advantages:

It can be learned from the foregoing technical solutions that the terminal device receives the configuration information from the network device, where the configuration information includes the M measurement resource sets, each measurement resource set includes one or more measurement resources, and M is an integer greater than or equal to 1; the terminal device measures the measurement resources based on the configuration information, and determines the measurement results for K measurement resource sets of the M measurement resource sets, where K is an integer greater than or equal to 1 and less than or equal to M; and the terminal device reports the measurement results for the K measurement resource sets to the network device. Therefore, it can be learned that the network device may configure the M measurement resource sets for the terminal device. In this way, the terminal device can measure the M measurement resource sets, and report the measurement results for the K measurement resource sets to the network device. Therefore, in the technical solutions of this application, measurement or reporting does not need to be performed a plurality of times. This reduces a measurement delay and reduces measurement reporting overheads.

BRIEF DESCRIPTION OF DRAWINGS

FIG. 4 is a schematic diagram of another embodiment of a resource measurement method according to an embodiment of this application;

FIG. 5 is a schematic diagram of another embodiment of a resource measurement method according to an embodiment of this application;

FIG. 6 is a schematic diagram of another embodiment of a resource measurement method according to an embodiment of this application;

FIG. 7 is a schematic diagram of another embodiment of a resource measurement method according to an embodiment of this application;

FIG. 8 is a schematic diagram of a structure of a communication apparatus according to an embodiment of this application;

FIG. 9 is a schematic diagram of another structure of a communication apparatus according to an embodiment of this application;

DESCRIPTION OF EMBODIMENTS

Figures 1A, 1B:
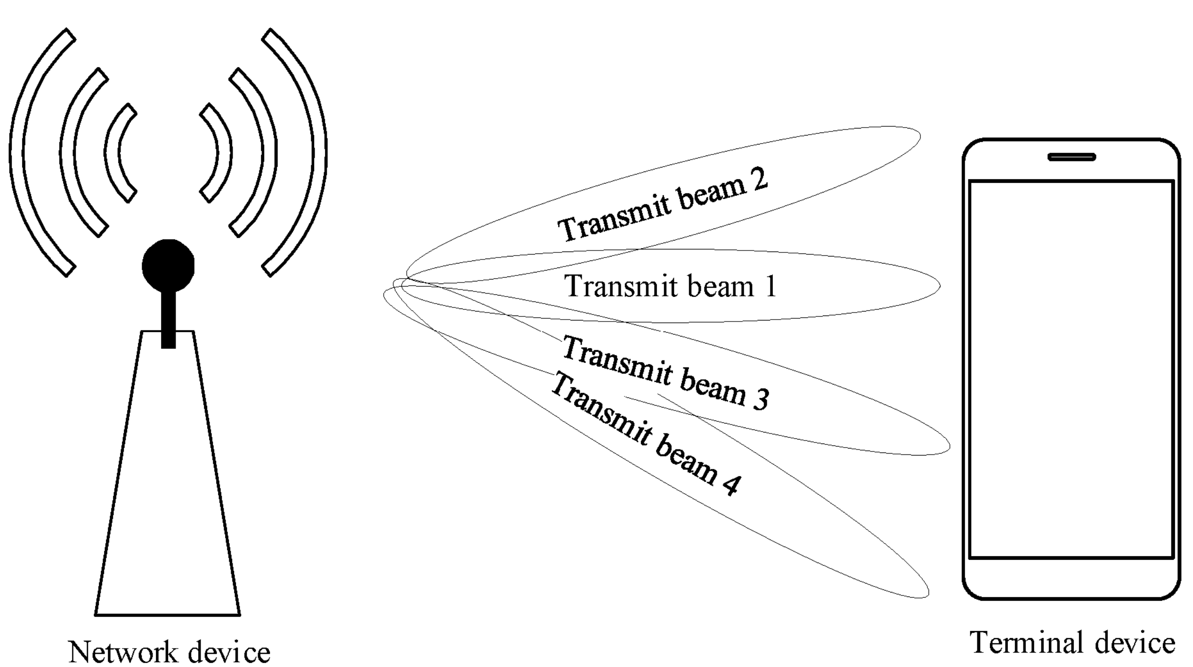
FIG. 1A is a schematic diagram of a scenario of a resource measurement method according to an embodiment of this application.
FIG. 1B is a schematic diagram of another scenario of a resource measurement method according to an embodiment of this application.

Embodiments of this application provide a resource measurement method and a communication apparatus, to reduce a measurement delay and reduce measurement reporting overheads.

Technical solutions in embodiments of this application may be applied to various communication systems, for example, a fifth-generation (5G) system, a new radio (NR) system, a long term evolution (LTE) system, an LTE frequency division duplex (FDD) system, an LTE time division duplex (TDD) system, a universal mobile telecommunications system (UMTS), a mobile communication system later than a 5G network (for example, a 6G mobile communication system), and a vehicle to everything (V2X) communication system.

A communication system to which this application is applicable includes a terminal device and a network device, and communication and transmission are performed between the network device and the terminal device through a beam.

The following describes a terminal device and a network device in this application.

The terminal device may be a wireless terminal device capable of receiving scheduling and indication information from the network device. The wireless terminal device may be a device that provides voice and/or data connectivity for a user, a handheld device with a wireless connection function, or another processing device connected to a wireless modem.

The terminal device, also referred to as user equipment (UE), a mobile station (MS), a mobile terminal (MT), or the like, is a device including a wireless communication function (providing voice/data connectivity for a user), for example, a handheld device with a wireless connection function or a vehicle-mounted device. Currently, some examples of the terminal device are a mobile phone (mobile phone), a tablet computer, a notebook computer, a palmtop computer, a mobile internet device (MID), a wearable device, a virtual reality (VR) device, an augmented reality (AR) device, a wireless terminal in industrial control (industrial control), a wireless terminal in an internet of vehicles, a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. For example, the wireless terminal in the internet of vehicles may be a vehicle-mounted device, an integrated vehicle device, a vehicle-mounted module, or a vehicle. The wireless terminal in industrial control may be a camera, a robot, or the like. The wireless terminal in a smart home may be a television, an air conditioner, a vacuum cleaning robot, a speaker, a set-top box, or the like.

The network device may be a device in a wireless network. For example, the network device is a device that is deployed in a radio access network and that provides a wireless communication function for the terminal device. For example, the network device may be a radio access network (radio access network, RAN) node for connecting the terminal device to a wireless network, and may also be referred to as an access network device.

The network device includes but is not limited to an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. The network device may alternatively be a network device in a 5G mobile communication system, for example, a next generation NodeB (gNB), a transmission and reception point (TRP), or a transmission point (TP) in a new radio (NR) system, or one antenna panel or a group of antenna panels (including a plurality of antenna panels) of a base station in the 5G mobile communication system. Alternatively, the network device may be a network node included in a gNB or a transmission point, for example, a baseband unit (BBU) or a distributed unit (DU).

In some deployment scenarios, the gNB may include a central unit (CU) and a DU. The gNB may further include an active antenna unit (AAU). The CU implements some functions of the gNB, and the DU implements some functions of the gNB. For example, the CU processes a non-real-time protocol and service, and implements functions of a radio resource control (RRC) layer and a packet data convergence protocol (PDCP) layer. The DU processes a physical layer protocol and a real-time service, and implements functions of a radio link control (RLC) layer, a media access control (MAC) layer, and a physical (PHY) layer. The AAU implements some physical layer processing functions, radio frequency processing, and functions related to an active antenna. RRC layer information is finally converted into PHY layer information, or is obtained by converting PHY layer information. Therefore, in this architecture, higher layer signaling (for example, RRC layer signaling) may also be considered as being sent by the DU, or sent by the DU and the AAU. It can be understood that the network device may be a device including one or more of a CU node, a DU node, and an AAU node. In addition, the CU may be categorized as a network device in a radio access network (RAN), or the CU may be categorized as a network device in a core network (CN). This is not limited in this application.

For ease of understanding embodiments of this application, the following first briefly describes several terms used in this application.

1. Beam

In an NR protocol, a beam may be represented as a spatial domain filter (spatial domain filter), or referred to as a spatial filter (spatial filter), a spatial domain parameter (spatial domain parameter), a spatial parameter (spatial parameter), a spatial domain setting (spatial domain setting), a spatial setting (spatial setting), quasi-colocation (QCL) information, a QCL assumption, a QCL indication, or the like. The beam may be indicated by a transmission configuration indicator state (TCI-state) parameter or a spatial relation (spatial relation) parameter. Therefore, in this application, the beam may be replaced with the spatial domain filter, the spatial filter, the spatial domain parameter, the spatial parameter, the spatial domain setting, the spatial setting, the QCL information, the QCL assumption, the QCL indication, the TCI-state (including an uplink TCI-state and a downlink TCI-state), the spatial relation, or the like. The foregoing terms are also equivalent to each other. The beam may alternatively be replaced with another term representing the beam. This is not limited in this application.

A beam for sending a signal may be referred to as a transmit beam (Tx beam), and may also be referred to as a spatial domain transmission filter (spatial domain transmission filter), a spatial transmission filter (spatial transmission filter), a spatial domain transmission parameter (spatial domain transmission parameter), a spatial transmission parameter (spatial transmission parameter), a spatial domain transmission setting (spatial domain transmission setting), or a spatial transmission setting (spatial transmission setting). A downlink transmit beam may be indicated by the TCI-state.

A beam for receiving a signal may be referred to as a receive beam (Rx beam), and may also be referred to as a spatial domain reception filter (spatial domain reception filter), a spatial reception filter (spatial reception filter), a spatial domain reception parameter (spatial domain reception parameter), a spatial reception parameter (spatial reception parameter), a spatial domain reception setting (spatial domain reception setting), or a spatial reception setting (spatial reception setting). An uplink transmit beam may be indicated by the spatial relation, the uplink TCI-state, or a sounding reference signal (SRS) resource (indicating a transmit beam using the SRS). Therefore, an uplink beam may alternatively be replaced with an SRS resource.

The transmit beam may be a signal strength distribution formed in different directions in space after a signal is transmitted by an antenna. The receive beam may be a signal strength distribution, in different directions in space, of a radio signal received by an antenna.

In addition, the beam may be a wide beam, a narrow beam, or another type of beam. A technology for forming a beam may be a beamforming technology or another technology. The beamforming technology may be a digital beamforming technology, an analog beamforming technology, a hybrid digital beamforming technology, a hybrid analog beamforming technology, or the like.

The beam usually corresponds to a resource. For example, during beam measurement, a network device measures different beams by using different resources, a terminal device feeds back resource quality obtained through measurement, and the network device learns of quality of a corresponding beam. During data transmission, information of a beam is also indicated by a resource corresponding to the beam. For example, the network device indicates information of a physical downlink shared channel (PDSCH) beam of the terminal device by using a TCI field in downlink control information (DCI).

In a possible implementation, a plurality of beams with a same communication feature or similar communication features are considered as one beam. One beam may include one or more antenna ports, configured to transmit a data channel, a control channel, a sounding signal, and the like. One or more antenna ports forming one beam may alternatively be considered as an antenna port set.

2. Resource

A resource is a configuration information element, including a related parameter of a reference signal, for example, a transmission interval or a used time-frequency resource location. Each beam corresponds to one resource. A network device sends, through a beam corresponding to a resource, a reference signal corresponding to the resource. A terminal device may determine quality of the beam or the resource by measuring the reference signal. Therefore, during beam measurement, a beam corresponding to a resource may be uniquely identified by an index of the resource. The resource may be an uplink signal resource or a downlink signal resource. An uplink signal includes but is not limited to an SRS and a demodulation reference signal (DMRS). A downlink signal includes but is not limited to a channel state information reference signal (CSI-RS), a cell specific reference signal (CS-RS), a UE specific reference signal (US-RS), a DMRS, and a synchronization signal/physical broadcast channel block (SS/PBCH block). The SS/PBCH block may be referred to as a synchronization signal block (SSB) for short.

The resource is configured by using RRC signaling. In terms of a configuration structure, a resource is a data structure, and includes a related parameter of an uplink signal or a downlink signal corresponding to the resource. For example, for the uplink signal, the resource includes a type of the uplink signal, a resource element carrying the uplink signal, transmission time and a transmission interval of the uplink signal, or a port used to send the uplink signal. For the downlink signal, the resource includes a type of the downlink signal, a resource element carrying the downlink signal, transmission time and a transmission interval of the downlink signal, or a quantity of ports used to send the downlink signal. A resource for each uplink signal or a resource for each downlink signal has a unique index to identify the resource. It can be understood that an index of a resource may also be referred to as an identifier of the resource. This is not limited in embodiments of this application.

3. The Resource Includes a Channel Measurement Resource and an Interference Measurement Resource.

The channel measurement resource is a resource configured by a network device for channel measurement. The channel measurement resource may be used to measure channel information such as reference signal received power (RSRP), a channel quality identifier (CQI), and a signal to interference plus noise ratio (SINR). During measurement on the CQI and SINR, the interference measurement resource further needs to be configured.

The interference measurement resource is a resource configured by the network device for interference measurement. During measurement on the channel information such as the CQI and the SINR, the interference measurement resource serves as an interference source to be used with the channel measurement resource to calculate the CQI and the SINR. For example, during measurement on an SINR of a channel measurement resource in a case in which an interference measurement resource serves as interference, energy of the channel measurement resource (namely, signal strength of the channel measurement resource) may serve as a numerator, and energy of the interference measurement resource (namely, signal strength of the interference measurement resource) may be used as a denominator, to calculate the SINR of the channel measurement resource.

For example, the network device determines, through a beam measurement process, a specific beam to be used to transmit data for a terminal device. To be specific, the network device selects, by measuring quality of each beam, a beam with best quality to transmit data for the terminal device. During beam measurement, the network device sequentially sends reference signals to the terminal device through respective transmit beams, and each beam corresponds to one reference signal. The terminal device may determine quality of each beam by measuring the reference signals. The quality of the beam may be determined based on RSRP of a corresponding reference signal. The terminal device may determine a beam with best quality (namely, highest RSRP) by measuring RSRP of each reference signal, and report information of the beam to the network device. In a communication protocol, related information of a reference signal exists in a form of a resource (a measurement resource). A resource is a configuration information element, and includes a related parameter of a reference signal, for example, a transmission interval or a used time-frequency resource location. Each beam corresponds to one resource. When the network device expects the terminal device to measure specific beams, the network device configures, for the terminal device, resources corresponding to the beams. Then the terminal device measures reference signals corresponding to the resources to determine quality of the beams, and reports information of a beam with best quality (an index of a resource corresponding to the beam). It should be noted that a concept of a beam is usually not directly described in the communication protocol, but is usually equivalently replaced with a resource. For example, in the communication protocol, a beam measurement process is described as follows: The network device configures a group of resources for the terminal device. The terminal device measures the group of resources and reports a resource with best quality. This is equivalent to that the terminal device measures a group of beams and reports information of a beam with best quality. Therefore, in this application, a beam and a resource are interchangeable, there is a correspondence between a resource and a beam, a channel measurement resource corresponds to a serving beam, and an interference measurement resource corresponds to an interfering beam. For more concepts related to a beam and a resource, refer to definitions of key terms. Details are not described herein.

The following describes two possible application scenarios to which this application is applicable. This application is still applicable to other application scenarios. This is not specifically limited in this application.

FIG. 1A is a schematic diagram of a scenario of a resource measurement method according to an embodiment of this application. As shown in FIG. 1A, a communication system includes a network device and a terminal device. The network device may send data to the terminal device through a transmit beam 1 to a transmit beam 4.

The network device may configure M channel measurement resource sets for the terminal device. The M channel measurement resource sets are used to measure signal quality of the transmit beam 1 to the transmit beam 4. In the scenario shown in FIG. 1A, each of the M channel measurement resource sets includes one or more channel measurement resources.

For example, the M channel measurement resource sets include two measurement resource sets: a measurement resource set 1 and a measurement resource set 2. The measurement resource set 1 includes a channel measurement resource 1 and a channel measurement resource 2. The measurement resource set 2 includes a channel measurement resource 3 and a channel measurement resource 4. Each channel measurement resource corresponds to a transmit beam and a receive beam. The transmit beam is used by the network device to send a channel measurement resource, and the receive beam is used by the terminal device to receive the channel measurement resource.

The channel measurement resource 1 corresponds to a transmit beam 1, and the channel measurement resource 2 corresponds to a transmit beam 2. The channel measurement resource 3 corresponds to a transmit beam 3, and the channel measurement resource 4 corresponds to a transmit beam 4. The terminal device receives the channel measurement resource 1 to the channel measurement resource 4 through corresponding receive beams. The terminal device measures channel measurement resources in the M measurement resource sets to obtain measurement results for the M channel measurement resource sets. For example, the measurement results for the M channel measurement resource sets include RSRP or an RSSI of a reference signal sent on each channel measurement resource in the M measurement resource sets.

To be specific, that the terminal device measures a channel measurement resource is equivalent to that the terminal device measures a reference signal on a transmit beam corresponding to the channel measurement resource. In this way, the terminal device can obtain signal quality of the transmit beam corresponding to the channel measurement resource.

FIG. 1B is a schematic diagram of another scenario of a resource measurement method according to an embodiment of this application. A communication system shown in FIG. 1B includes a network device and terminal devices. The network device performs communication and transmission with a terminal device 1 through a transmit beam 1. The network device performs communication and transmission with a terminal device 2 through a transmit beam 2. The network device performs communication and transmission with a terminal device 3 through a transmit beam 3. The network device performs communication and transmission with a terminal device 4 through a transmit beam 4. The network device performs communication and transmission with a terminal device 5 through a transmit beam 5.

For the terminal device 1, signals on the transmit beam 2 to the transmit beam 5 are interfering signals. To be specific, the transmit beam 1 is a serving beam for the terminal device 1, and the transmit beam 2 to the transmit beam 5 are interfering beams for the terminal device 1. The network device may configure a first channel measurement resource and M interference measurement resource sets for the terminal device. The first channel measurement resource is used to measure signal quality of the transmit beam 1. Interference measurement resources included in the M interference measurement resource sets are used to determine statuses of interference, to the transmit beam 1, caused by interfering signals on the transmit beam 2 to the transmit beam 5. To be specific, the M interference measurement resource sets are used to determine statuses of interference caused by the interference measurement resources included in the M interference measurement resource sets to the first channel measurement resource.

For example, as shown in FIG. 1B, the network device configures two interference measurement resource sets and the first channel measurement resource for the terminal device. The two interference measurement resource sets include an interference measurement resource set 1 and an interference measurement resource set 2. The first channel measurement resource corresponds to the transmit beam 1. The interference measurement resource set 1 includes an interference measurement resource 1 and an interference measurement resource 2. The interference measurement resource set 2 includes an interference measurement resource 3 and an interference measurement resource set 4. Each interference measurement resource corresponds a transmit beam and a receive beam. The transmit beam is used by the network device to send an interference measurement resource, and the receive beam is used by the terminal device to receive the interference measurement resource. As shown in FIG. 1B, the interference measurement resource 1 corresponds to the transmit beam 2, the interference measurement resource 2 corresponds to the transmit beam 3, the interference measurement resource 3 corresponds to the transmit beam 4, and the interference measurement resource 4 corresponds to the transmit beam 5. The terminal device receives, through a corresponding receive beam, the first channel measurement resource and the interference measurement resources included in the two interference measurement resource sets. Then the terminal device may measure the first channel measurement resource and the two interference measurement resource sets to obtain a measurement result for the first channel measurement resource and measurement results for the two interference measurement resource sets.

The following describes technical solutions of this application with reference to specific embodiments.

Figure 2:
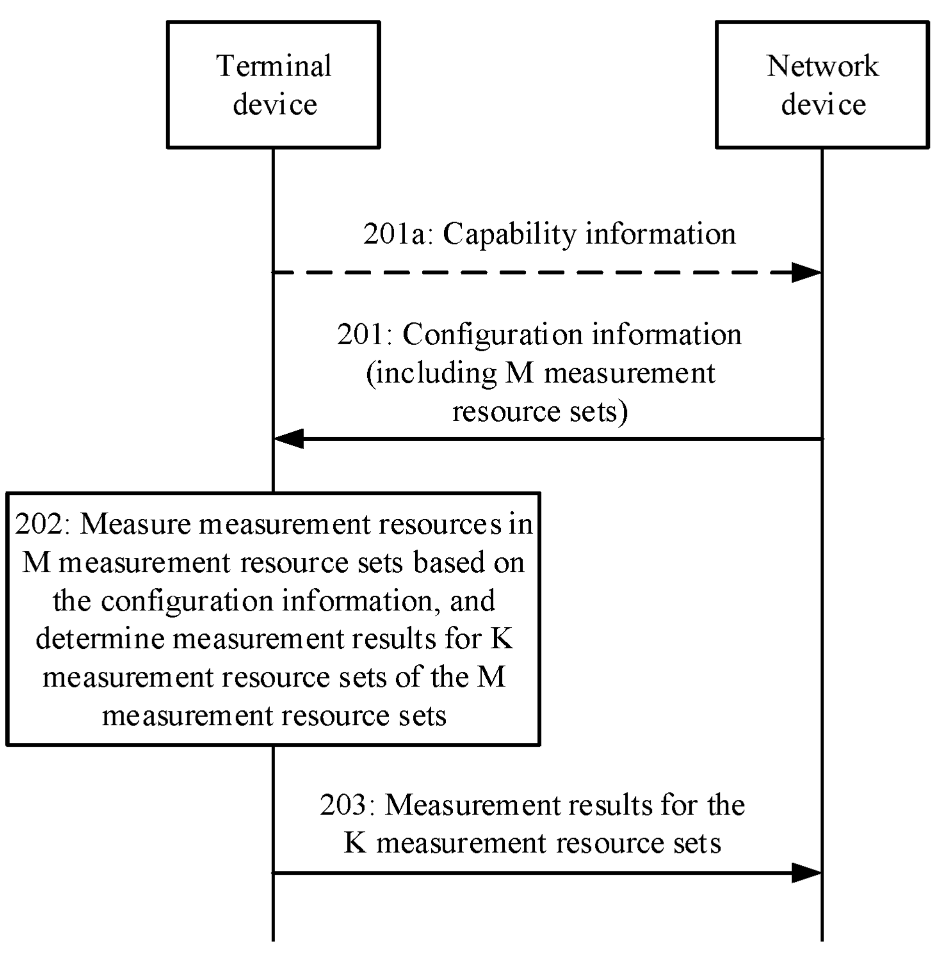
FIG. 2 is a schematic diagram of an embodiment of a resource measurement method according to an embodiment of this application.

FIG. 2 is a schematic diagram of an embodiment of a resource measurement method according to an embodiment of this application. As shown in FIG. 2, the method includes the following steps.

201: A network device sends configuration information to a terminal device. Correspondingly, the terminal device receives the configuration information from the network device.

The configuration information includes M measurement resource sets. Each measurement resource set includes one or more measurement resources. M is an integer greater than or equal to 1.

The M measurement resource sets may be M resource settings (resource setting), M resource sets (resource set), or M resource subsets (resource subset). A resource subset is a subset of a resource set.

Optionally, the measurement resource is a channel measurement resource or an interference measurement resource. To be specific, the M measurement resource sets include M channel measurement resource sets, or the M measurement resource sets include M interference measurement resource sets.

In some implementations, if the measurement resource is an interference measurement resource, the configuration information further includes a first channel measurement resource. The M measurement resource sets are M interference measurement resource sets. The M interference measurement resource sets are used to determine statuses of interference caused by interference measurement resources included in the M interference measurement resource sets to the first channel measurement resource.

The following describes a division manner for the M measurement resource sets.

In a possible implementation, the measurement resource is a channel measurement resource. To be specific, the M measurement resource sets are M channel measurement resource sets. The M channel measurement resource sets may be obtained through division based on a spatial arrangement relationship between transmit beams corresponding to channel measurement resources.

For example, as shown in FIG. 1A, a channel measurement resource corresponding to a transmit beam 1 and a channel measurement resource corresponding to a transmit beam 2 may be grouped into a measurement resource set 1, and a channel measurement resource corresponding to a transmit beam 3 and a channel measurement resource corresponding to a transmit beam 4 may be grouped into a measurement resource set 2.

The terminal device measures the channel measurement resource set and reports a corresponding measurement result. This can reduce measurement result reporting overheads. In other words, the network device can obtain information of more beams with same reporting overheads.

In another possible implementation, the measurement resource is an interference measurement resource. To be specific, the M measurement resource sets are M interference measurement resource sets. The M interference measurement resource sets may be obtained through division based on degrees of interference caused by interference measurement resources to the first channel measurement resource.

A plurality of interfering beams corresponding to a plurality of interference measurement resources included in one interference measurement resource set are usually interfering beams causing similar degrees of interference to a serving beam corresponding to the first channel measurement resource. To be specific, the network device may group interference measurement resources corresponding to a plurality of interfering beams into an interference measurement resource set.

For example, as shown in FIG. 1B, the first channel measurement resource corresponds to a transmit beam 1, to be specific, the transmit beam 1 is a serving beam of a terminal device 1. An interference measurement resource 1 corresponds to a transmit beam 2, and an interference measurement resource 2 corresponds to a transmit beam 3, to be specific, the transmit beam 2 and the transmit beam 3 are interfering beams. The transmit beam 2 and the transmit beam 3 cause similar degrees of interference to the transmit beam 1. The interference measurement resource 1 and the interference measurement resource 2 may be grouped into a measurement resource set 1. An interference measurement resource 3 corresponds to a transmit beam 4, and an interference measurement resource 4 corresponds to a transmit beam 5. The transmit beam 4 and the transmit beam 5 are interfering beams. The transmit beam 3 and the transmit beam 4 cause similar degrees of interference to the transmit beam 1. The interference measurement resource 3 and the interference measurement resource 4 may be grouped into a measurement resource set 2.

The terminal device measures the interference measurement resource set and reports a measurement result. This can reduce measurement result reporting overheads. In other words, the network device can obtain information of more interfering beams with same reporting overheads. Interfering beams corresponding to different interference measurement resources included in one interference measurement resource set cause similar degrees of interference to the serving beam corresponding to the first channel measurement resource. Therefore, the terminal device performs measurement and reports a measurement result in a form of an interference measurement resource set, and the network device can still obtain information of a corresponding interfering beam.

For example, a serving beam of the terminal device is the transmit beam 1, the terminal device has 40 interfering beams, and every 10 interfering beams are grouped into one interference measurement resource set. In this case, the network device may configure four interference measurement resource sets for the terminal device. The terminal device measures average signal strength of the interference measurement resource sets, and reports, to the network device, a measurement result for an interference measurement resource set with highest average signal strength. In this case, the network device may obtain information of 10 interference measurement resources in the interference measurement resource set. To be specific, in this application, interference measurement resources are grouped, so that the network device can obtain measurement results for more interference measurement resources with same reporting overheads.

It should be noted that, optionally, degrees of interference caused by the interference measurement resources to the first channel measurement resource may be determined based on an arrangement relationship between transmit beams corresponding to the interference measurement resources.

In some implementations, the configuration information further includes information about a reported value, and the information about the reported value is a type of a measurement result reported by the terminal device. The reported value includes at least one of the following: an index of a measurement resource set, a measurement result for the measurement resource set, a resource index, a CQI, an SINR, a channel rank indicator (RI), and a precoding matrix indicator (PMI).

Optionally, the embodiment shown in FIG. 2 further includes step 201*a*. Step 201*a* may be performed before step 201.

201*a*: The terminal device sends capability information to the network device. Correspondingly, the network device receives the capability information from the terminal device.

The capability information includes at least one of the following: a quantity of measurement resource sets supported by the terminal device, a quantity of resources included in a measurement resource set supported by the terminal device, or a total quantity of resources included in a plurality of measurement resource sets supported by the terminal device.

Optionally, the quantity of measurement resource sets supported by the terminal device includes a quantity of measurement resource sets that the terminal device is capable of measuring, and/or a quantity of measurement resource sets that the terminal device is capable of reporting.

For example, the capability information includes a quantity of measurement resource sets that the terminal device is capable of measuring or reporting, or an upper limit of a quantity of measurement resource sets that the terminal device is capable of measuring or reporting. For example, the upper limit is M.

Optionally, the quantity of resources included in the measurement resource set supported by the terminal device includes a quantity of resources included in a measurement resource set that the terminal device is capable of measuring, and/or a quantity of resources included in a measurement resource set that the terminal device is capable of reporting.

For example, the capability information includes a quantity of measurement resources included in a measurement resource set that the terminal device is capable of measuring or reporting, or an upper limit of a quantity of measurement resources included in a measurement resource set that the terminal device is capable of measuring or reporting.

Optionally, the total quantity of resources included in the plurality of measurement resource sets supported by the terminal device includes a total quantity of resources that the terminal device is capable of measuring, and/or a total quantity of resources that the terminal device is capable of reporting.

For example, the capability information includes a total quantity of measurement resources that the terminal device is capable of measuring or reporting, or an upper limit of a total quantity of measurement resources that the terminal device is capable of measuring or reporting.

The network device obtains the capability information of the terminal device in step 201*a*. The network device may configure, for the terminal device based on the capability information of the terminal device, a corresponding measurement resource set and a quantity of measurement resources included in each measurement resource set.

202: The terminal device measures measurement resources in the M measurement resource sets based on the configuration information, and determines measurement results for K measurement resource sets of the M measurement resource sets.

Specifically, the terminal device may measure the measurement resources in the M measurement resource sets, and determine the measurement results for the K measurement resource sets from measurement results for the M measurement resource sets.

It should be noted that the terminal device may measure measurement resources included in some or all of the M measurement resource sets. For a measurement resource set, the terminal device may measure some or all measurement resources in the measurement resource set. This is not specifically limited in this application.

In some implementations, if the measurement resource is a channel measurement resource, the M measurement resource sets include M channel measurement resource sets. Each channel measurement resource in the M measurement resource sets corresponds to a transmit beam and a receive beam. Different channel measurement resources may correspond to different transmit beams and receive beams.

For example, a channel measurement resource 1 corresponds to a transmit beam 1, a channel measurement resource 2 corresponds to a transmit beam 2, a channel measurement resource 3 corresponds to a transmit beam 3, and a channel measurement resource 4 corresponds to a transmit beam 4. The transmit beam is a beam used by the network device to send a reference signal on the channel measurement resource. The terminal device receives the reference signal on the channel measurement resource through a corresponding receive beam. The receive beam may be determined based on configuration information of the channel measurement resource. The terminal device measures the channel measurement resources included in the M channel measurement resource sets to obtain the measurement results for the M measurement resource sets. The terminal device determines the measurement results for the K measurement resource sets from the measurement results for the M measurement resource sets.

In some implementations, if the measurement resource is an interference measurement resource, the M measurement resource sets include M interference measurement resource sets, and the configuration information further includes a first channel measurement resource.

The M interference measurement resource sets are used to determine statuses of interference caused by the interference measurement resources in the M interference measurement resource sets to the first channel measurement resource.

In a possible implementation, for an interference measurement resource set, the terminal device receives interference measurement resources in the interference measurement resource set through one receive beam. The receive beam is a beam used by the terminal device to receive the first channel measurement resource.

For example, as shown in FIG. 1B, the first channel measurement resource corresponds to a transmit beam 1, and the terminal device receives the first channel measurement resource through a receive beam 1 corresponding to the first channel measurement resource (to be specific, receives a reference signal sent by the network device through the transmit beam 1). An interference measurement resource set 1 includes an interference measurement resource 1 and an interference measurement resource 2. The interference measurement resource 1 corresponds to a transmit beam 2, and the interference measurement resource 2 corresponds to a transmit beam 3. The terminal device receives, through the receive beam 1, the interference measurement resource 1 and the interference measurement resource 2 that are included in the interference measurement resource set 1 (to be specific, receives a reference signal sent by the network device through the transmit beam 2 and a reference signal sent by the network device through the transmit beam 3).

In another possible implementation, the terminal device receives, through one receive beam, the interference measurement resources included in the M interference measurement resource sets. The receive beam is a beam used by the terminal device to receive the first channel measurement resource.

For example, as shown in FIG. 1B, the first channel measurement resource corresponds to a transmit beam 1, and the terminal device receives the first channel measurement resource through a receive beam 1 corresponding to the first channel measurement resource (to be specific, receives a reference signal sent by the network device through the transmit beam 1). An interference measurement resource set 1 includes an interference measurement resource 1 and an interference measurement resource 2. The interference measurement resource 1 corresponds to a transmit beam 2, and the interference measurement resource 2 corresponds to a transmit beam 3. An interference measurement resource set 2 includes an interference measurement resource 3 and an interference measurement resource 4. The interference measurement resource 3 corresponds to a transmit beam 4, and the interference measurement resource 4 corresponds to a transmit beam 5. The terminal device receives, through the receive beam 1, the interference measurement resource 1 and the interference measurement resource 2 that are included in the interference measurement resource set 1, and the interference measurement resource 3 and the interference measurement resource 4 that are included in the interference measurement resource set 2.

There are a plurality of specific determining manners of determining, by the terminal device, the measurement results for the K measurement resource sets in step 202. For details, refer to related descriptions of FIG. 3 and FIG. 4 below. Details are not described herein.

203: The terminal device reports the measurement results for the K measurement resource sets to the network device. Correspondingly, the network device receives the measurement results for the K measurement resource sets from the terminal device.

In this embodiment of this application, the terminal device receives the configuration information from the network device, where the configuration information includes the M measurement resource sets, each measurement resource set includes one or more measurement resources, and M is an integer greater than or equal to 1; the terminal device measures measurement resources based on the configuration information, and determines the measurement results for K measurement resource sets of the M measurement resource sets, where K is an integer greater than or equal to 1 and less than or equal to M; and the terminal device reports the measurement results to the network device. It can be learned that the network device may configure the M measurement resource sets for the terminal device, so that the terminal device can measure the M measurement resource sets, without performing measurement or reporting a plurality of times. This reduces a measurement delay and reduces measurement reporting overheads. If the measurement resource is an interference measurement resource, the configuration information further includes the first channel measurement resource, and the terminal device measures the M interference measurement resource sets and reports the measurement results for the K measurement resource sets. For the first channel measurement resource, the network device can obtain the measurement results for the K measurement resource sets through one time of reporting performed by the terminal device. To be specific, in this application, interference measurement resources are grouped, so that the network device can obtain measurement results for more interference measurement resources with same reporting overheads.

Figure 3:
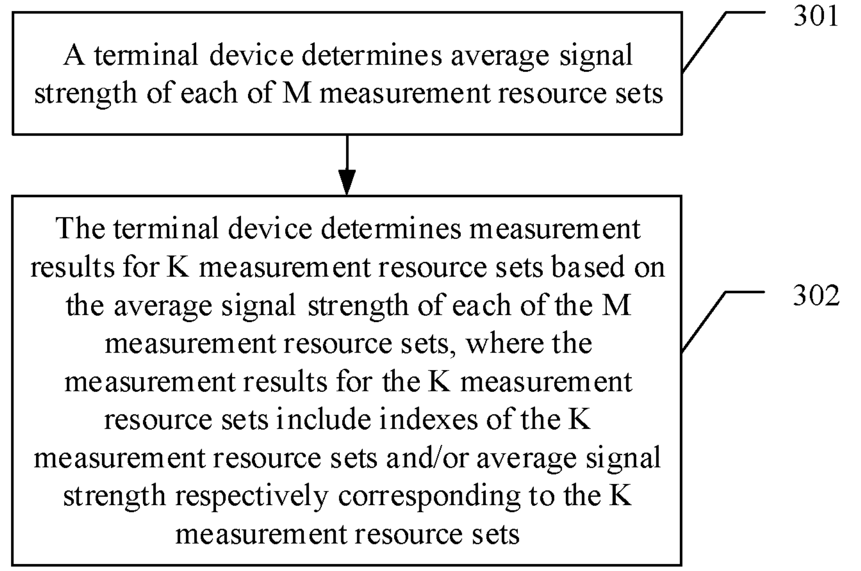
FIG. 3 is a schematic diagram of another embodiment of a resource measurement method according to an embodiment of this application.

With reference to embodiments shown in FIG. 3 and FIG. 4, the following describes several possible implementations of determining, by the terminal device, the measurement results for the K measurement resource sets.

FIG. 3 is a schematic diagram of an embodiment of a resource measurement method according to an embodiment of this application. As shown in FIG. 3, the method includes the following steps.

301: A terminal device determines average signal strength of each of M measurement resource sets.

The average signal strength of each measurement resource set is an average value of signal strength of all measurement resources included in the measurement resource set.

For example, the average signal strength of each measurement resource set may be average RSRP, an average RSSI, or another indicator that represents signal strength.

There are a plurality of manners of determining, by the terminal device, the average signal strength of each of the M measurement resource sets. The following describes two possible implementations. This application is still applicable to other implementations. This is not specifically limited in this application.

The following describes a first implementation with reference to step 301*a* and step 301*b*.

301*a*: The terminal device measures signal strength of each measurement resource included in each measurement resource set.

For example, if the measurement resource is a channel measurement resource, the terminal device receives a measurement resource on a receive beam corresponding to each channel measurement resource (to be specific, receives a reference signal sent by a network device on a transmit beam corresponding to the channel measurement resource). Then the terminal device measures each channel measurement resource to obtain signal strength of the channel measurement resource.

For example, if the measurement resource is an interference measurement resource, the terminal device receives an interference measurement resource on a receive beam corresponding to each interference measurement resource (namely, a receive beam corresponding to a first channel measurement resource) (to be specific, receives a reference signal sent by the network device on a transmit beam corresponding to the interference measurement resource). Then the terminal device measures each interference measurement resource to obtain signal strength of the interference measurement resource.

In some implementations, if at least one of the measurement resources included in the M measurement resource sets includes a plurality of antenna ports, signal strength of the at least one measurement resource is an average value of signal strength corresponding to the plurality of antenna ports, or signal strength of the at least one measurement resource is a sum of signal strength corresponding to the plurality of antenna ports.

In this implementation, for a measurement resource, if the network device sends the measurement resource through a plurality of antenna ports, signal strength of the measurement resource may be an average value of signal strength corresponding to the plurality of antenna ports, or a sum of signal strength corresponding to the plurality of antenna ports.

One antenna port may correspond to one signal strength value, or at least two antenna ports correspond to one signal strength value. This is not specifically limited in this application. To be specific, the terminal device may determine signal strength of an antenna port by receiving a signal from the antenna port. Alternatively, the terminal device may receive signals from at least two antenna ports, and determine, based on the signals from the at least two antenna ports, a signal strength value corresponding to the at least two antenna ports. An example in which one antenna port corresponds to one signal strength value is used below for description.

For example, a first measurement resource set of the M measurement resource sets includes a measurement resource 1. The measurement resource 1 includes an antenna port 1 and an antenna port 2. Signal strength of the antenna port 1 is A1, and signal strength of the antenna port 2 is A2. In this case, the terminal device may determine that signal strength of the measurement resource 1 is (A1+A2)/2, or signal strength of the measurement resource 1 is A1+A2.

It should be noted that the at least one measurement resource may belong to one measurement resource set, or may belong to different measurement resource sets. To be specific, at least one of the measurement resources included in at least one of the M measurement resource sets includes a plurality of antenna ports.

For example, the at least one measurement resource includes a measurement resource 1 and a measurement resource 2. The measurement resource 1 and the measurement resource 2 each include at least two antenna ports. The measurement resource 1 belongs to a measurement resource set 1, and the measurement resource 2 belongs to a measurement resource set 2. Alternatively, both the measurement resource 1 and the measurement resource 2 belong to the measurement resource set 1.

301*b*: The terminal device determines the average signal strength of each measurement resource set based on signal strength of each measurement resource included in the measurement resource set.

For example, a measurement resource set 1 includes a measurement resource 1 and a measurement resource 2. Signal strength of the measurement resource 1 is A, and signal strength of the measurement resource 2 is B. In this case, the terminal device may determine that average signal strength of the measurement resource set 1 is (A+B)/2.

The following describes a second implementation with reference to step 301*c* to step 301*e*. In the second implementation, measurement resources included in one measurement resource set of the M measurement resource sets each include a same quantity of antenna ports. The M measurement resource sets include a first measurement resource set. In the following step 301*c* to step 301*e*, an example in which the terminal device determines average signal strength of the first measurement resource set is used to describe the second implementation.

301*c*: The terminal device measures signal strength corresponding to antenna ports with a same number for all measurement resources included in the first measurement resource set.

For example, the first measurement resource set includes a measurement resource 1 and a measurement resource 2. The measurement resource 1 and the measurement resource 2 each include an antenna port 1 and an antenna port 2. The terminal device determines that signal strength of an antenna port 1 included in the measurement resource 1 is a1, and signal strength of an antenna port 1 included in the measurement resource 2 is a2. The terminal device determines that signal strength of an antenna port 2 included in the measurement resource 1 is b1, and signal strength of an antenna port 2 included in the measurement resource 2 is b2.

301*d*: The terminal device uses an average value of signal strength of all the measurement resources in the first measurement resource set on the antenna ports with the same number as average signal strength of the antenna ports with the same number, to obtain average signal strength respectively corresponding to a plurality of antenna ports.

For example, it can be learned from the example of step 301*c* that the terminal device may determine that average signal strength of the antenna ports 1 is (a1+a2)/2, and average signal strength of the antenna ports 2 is (b1+b2)/2.

301*e*: The terminal device uses a sum of the average signal strength respectively corresponding to the plurality of antenna ports as the average signal strength of the first measurement resource set, or the terminal device uses an average value of the average signal strength respectively corresponding to the plurality of antenna ports as the average signal strength of the first measurement resource set.

For example, the average signal strength of the first measurement resource set is equal to the average signal strength of the antenna ports 1 plus the average signal strength of the antenna ports 2, that is, [(a1+a2)/2+(b1+b2)/2].

For example, the average signal strength of the first measurement resource set is an average value of the average signal strength of the antenna ports 1 and the average signal strength of the antenna ports 2, that is, [(a1+a2)/2+(b1+b2)/2]/2.

In a possible implementation, if the measurement resource is an interference measurement resource, average signal strength of each antenna port may be understood as an interference layer (interference layer). The terminal device may perform summation on interference layers respectively corresponding to the plurality of antenna ports to obtain average signal strength of a first interference measurement resource set, or the terminal device may use an average value of interference layers respectively corresponding to the plurality of antenna ports as average signal strength of a first interference measurement resource set.

It should be noted that, optionally, if configuration information further includes a first channel measurement resource, in step 301, the terminal device further measures the first channel measurement resource to obtain signal strength of the first channel measurement resource. The terminal device may report the signal strength of the first channel measurement resource to the network device.

302: The terminal device determines measurement results for K measurement resource sets based on the average signal strength of each of the M measurement resource sets.

The measurement results for the K measurement resource sets include indexes of the K measurement resource sets and/or average signal strength respectively corresponding to the K measurement resource sets.

Specifically, the terminal device selects the K measurement resource sets from the M measurement resource sets based on the average signal strength of each of the M measurement resource sets, to obtain the measurement results for the K measurement resource sets.

In some implementations, the K measurement resource sets include:

K measurement resource sets with highest average signal strength among the M measurement resource sets;

K measurement resource sets with lowest average signal strength among the M measurement resource sets;

K measurement resource sets whose average signal strength is greater than a first threshold among the M measurement resource sets; or K measurement resource sets whose average signal strength is less than the first threshold among the M measurement resource sets. K is an integer greater than or equal to 1.

The K measurement resource sets whose average signal strength is greater than the first threshold among the M measurement resource sets may alternatively be replaced with K measurement resource sets whose average signal strength is greater than or equal to the first threshold among the M measurement resource sets.

The K measurement resource sets whose average signal strength is less than the first threshold among the M measurement resource sets may alternatively be replaced with K measurement resource sets whose average signal strength is less than or equal to the first threshold among the M measurement resource sets.

It should be noted that the first threshold may be specified in a communication protocol, configured by the network device for the terminal device, or reported by the terminal device to the network device. This is not specifically limited in this application.

It should be noted that, optionally, a value setting factor for the first threshold may include a channel state and a channel quality requirement for the first channel measurement resource.

Based on the implementations of step 301 and step 302, step 203 in the embodiment shown in FIG. 2 may include: The terminal device reports the measurement results for the K measurement resource sets to the network device, where the measurement results for the K measurement resource sets include the indexes of the K measurement resource sets and/or the average signal strength respectively corresponding to the K measurement resource sets.

If the measurement resource is an interference measurement resource, the terminal device reports, to the network device, measurement results for K interference measurement resource sets with highest or lowest average signal strength, or reports measurement results for K interference measurement resource sets whose average signal strength is greater than the first threshold or less than or equal to the first threshold. In this way, during communication and transmission between the network device performs and the terminal device, the network device can avoid performing communication and transmission with another terminal device on an interfering beam that causes strong interference to the terminal device. This improves performance of communication and transmission.

It should be noted that the indexes of the K measurement resource sets and the average signal strength respectively corresponding to the K measurement resource sets may be reported separately or together. This is not specifically limited in this application.

For example, if the M measurement resource sets are M interference measurement resource sets and the measurement results for the K measurement resource sets include indexes of K interference measurement resource sets, the network device may determine specific K interference measurement resource sets. For example, the network device may determine that the K interference measurement resource sets are measurement resource sets causing strong interference to the first channel measurement resource. The terminal device does not need to report average signal strength respectively corresponding to the K interference measurement resource sets. When the network device can determine a degree of interference caused by an interference measurement resource set, reporting overheads can be reduced.

If measurement results for the K interference measurement resource sets include the average signal strength respectively corresponding to the K interference measurement resource sets, or measurement results for the K interference measurement resource sets include the indexes of the K interference measurement resource sets and the average signal strength respectively corresponding to the K interference measurement resource sets, the network device may determine a status of interference caused by each of the K interference measurement resource sets to the first channel measurement resource. In this way, the network device can select an appropriate beam for the terminal device to perform communication and transmission.

It can be learned from the technical solution of the embodiment shown in FIG. 3 that the terminal device determines the average signal strength of each of the M measurement resource sets. Then the terminal device determines the measurement results for the K measurement resource sets based on the average signal strength of each of the M measurement resource sets. The measurement results for the K measurement resource sets include the indexes of the K measurement resource sets and/or the average signal strength respectively corresponding to the K measurement resource sets. The network device may obtain the measurement results for the K measurement resource sets. Measurement or reporting does not need to be performed a plurality of times. This reduces a measurement delay and reduces measurement result reporting overheads. If the measurement resource is an interference measurement resource, the network device may determine a status of interference caused by each of the K interference measurement resource sets to the first channel measurement resource. In this way, the network device can perform communication and transmission based on the status of the interference caused by the interference measurement resource to the first channel measurement resource. For example, during transmission between the network device and the terminal device, communication and transmission on an interfering beam corresponding to an interference measurement resource that causes strong interference to the first channel measurement resource are avoided. This improves performance of communication and transmission.

FIG. 4 is a schematic diagram of another embodiment of a resource measurement method according to an embodiment of this application. As shown in FIG. 4, the method includes the following steps.

401: A terminal device determines measurement results for K interference measurement resource sets based on a first channel measurement resource and M interference measurement resource sets.

In step 201 in the embodiment shown in FIG. 2, the configuration information further includes the first channel measurement resource, and the M measurement resource sets are M interference measurement resource sets. Each interference measurement resource set includes one or more interference measurement resources. The measurement results for the K measurement resource sets are measurement results for K interference measurement resource sets.

There are a plurality of manners of determining, by the terminal device, the measurement results for the K interference measurement resource sets in step 401. The following describes the manners with reference to embodiments shown in FIG. 5, FIG. 6, and FIG. 7. Details are not described herein.

It can be learned from the technical solution of the embodiment shown in FIG. 4 that the terminal device determines the measurement results for the K interference measurement resource sets based on the first channel measurement resource and the M interference measurement resource sets. It can be learned that the network device configures the M interference measurement resource sets for the terminal device, and the M interference measurement resource sets are used to determine statuses of interference caused by the M interference measurement resource sets to the first channel measurement resource. The terminal device may measure interference measurement resources included in the M interference measurement resource sets, and report the measurement results for the K interference measurement resource sets. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads.

With reference to the embodiments shown in FIG. 5, FIG. 6, and FIG. 7, the following describes a process of determining, by the terminal device, the measurement results for the K interference measurement resource sets based on the first channel measurement resource and the M interference measurement resource sets.

FIG. 5 is a schematic diagram of another embodiment of a resource measurement method according to an embodiment of this application. As shown in FIG. 5, the method includes the following steps.

501: A terminal device determines M first signal to interference plus noise ratios based on a first channel measurement resource and M interference measurement resource sets.

The M first signal to interference plus noise ratios correspond to the M interference measurement resource sets. An ith first signal to interference plus noise ratio of the M first signal to interference plus noise ratios is a signal to interference plus noise ratio of the first channel measurement resource that is determined by using an ith interference measurement resource set as interference. i is an integer greater than or equal to 1 and less than or equal to M.

In a possible implementation, the ith first signal to interference plus noise ratio is a signal to interference plus noise ratio of the first channel measurement resource that is determined by using average signal strength of the ith interference measurement resource set as interference.

The average signal strength of the ith interference measurement resource set is an average value of signal strength of all interference measurement resources included in the ith interference measurement resource set.

Specifically, the terminal device measures the first channel measurement resource and interference measurement resources included in the M interference measurement resource sets to obtain signal strength of the first channel measurement resource and average signal strength respectively corresponding to the M interference measurement resource sets. The terminal device determines the M first signal to interference plus noise ratios based on the signal strength of the first channel measurement resource and the average signal strength respectively corresponding to the M interference measurement resource sets.

For example, a 1st first signal to interference plus noise ratio of the M first signal to interference plus noise ratios is a signal to interference plus noise ratio of the first channel measurement resource that is calculated by using average signal strength of a 1st interference measurement resource set as interference. For example, the terminal device determines that the average signal strength of the 1st interference measurement resource set is I. The terminal device measures the first channel measurement resource to obtain signal strength S of the first channel measurement resource. Signal strength of noise received by the terminal device is N. In this case, the first signal to interference plus noise ratio SINR1 is equal to S/(N+I). A manner of determining other first signal to interference plus noise ratios of the M first signal to interference plus noise ratios is similar. Details are not described herein again.

Optionally, if any interference measurement resource in the ith interference measurement resource set includes a plurality of antenna ports, Signal strength of the any interference measurement resource is an average value of signal strength corresponding to the plurality of antenna ports, or signal strength of the any interference measurement resource is a sum of signal strength corresponding to the plurality of antenna ports.

There are a plurality of manners of determining the average signal strength respectively corresponding to the M interference measurement resource sets. For a manner of determining the average signal strength respectively corresponding to the M interference measurement resource sets, refer to related descriptions in the embodiment shown in steps 301*a* and 301*b* or steps 301*c* to 301*e*. Details are not described herein again.

502: The terminal device determines the measurement results for the K interference measurement resource sets based on the M first signal to interference plus noise ratios.

The measurement results for the K interference measurement resource sets include first signal to interference plus noise ratios respectively corresponding to the K interference measurement resource sets and/or indexes of the K interference measurement resource sets.

Specifically, the terminal device selects the K interference measurement resource sets from the M interference measurement resource sets based on the M first signal to interference plus noise ratios, to obtain the measurement results for the K interference measurement resource sets.

In some implementations, the K interference measurement resource sets include:

K interference measurement resource sets corresponding to a largest first signal to interference plus noise ratio among the M interference measurement resource sets; or K interference measurement resource sets corresponding to a smallest first signal to interference plus noise ratio among the M interference measurement resource sets; or an interference measurement resource set corresponding to a first signal to interference plus noise ratio greater than a second threshold among the M interference measurement resource sets; or an interference measurement resource set corresponding to a first signal to interference plus noise ratio less than the second threshold among the M interference measurement resource sets.

It should be noted that the second threshold may be specified in a communication protocol, configured by a network device for the terminal device, or reported by the terminal device to the network device. This is not specifically limited in this application.

It should be noted that, optionally, a value setting factor for the second threshold may include a channel state and a channel quality requirement for the first channel measurement resource.

The interference measurement resource set corresponding to the first signal to interference plus noise ratio greater than the second threshold among the M interference measurement resource sets may be replaced with an interference measurement resource set corresponding to a first signal to interference plus noise ratio greater than or equal to the second threshold among the M interference measurement resource sets.

The interference measurement resource set corresponding to the first signal to interference plus noise ratio less than the second threshold among the M interference measurement resource sets may be replaced with an interference measurement resource set corresponding to a first signal to interference plus noise ratio less than or equal to the second threshold among the M interference measurement resource sets.

The terminal device reports, to the network device, measurement results for the K interference measurement resource sets with the largest or smallest first signal to interference plus noise ratio, or the terminal device reports, to the network device, measurement results for K interference measurement resource sets whose first signal to interference plus noise ratios are greater than the second threshold or less than the second threshold. In this way, during communication and transmission between the network device performs and the terminal device, the network device can avoid performing communication and transmission with another terminal device on an interfering beam that causes strong interference to the terminal device. This improves performance of communication and transmission.

Based on the implementations of step 501 and step 502, step 203 in the embodiment shown in FIG. 2 may include: The terminal device reports the measurement results for the K interference measurement resources to the network device, where the measurement results for the K interference measurement resource sets include the first signal to interference plus noise ratios respectively corresponding to the K interference measurement resource sets and/or the indexes of the K interference measurement resource sets.

It should be noted that the first signal to interference plus noise ratios respectively corresponding to the K interference measurement resource sets and the indexes of the K interference measurement resource sets may be reported separately or together. This is not specifically limited in this application.

In this embodiment of this application, it can be learned from step 501 and step 502 that the M interference measurement resource sets are used to determine statuses of interference caused by the interference measurement resources included in the M interference measurement resource sets to the first channel measurement resource. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads. The measurement results for the K interference measurement resource sets include the first signal to interference plus noise ratios respectively corresponding to the K interference measurement resource sets and/or the indexes of the K interference measurement resource sets. In this way, the network device can perform communication and transmission based on a status of interference caused by an interference measurement resource to the first channel measurement resource. For example, during transmission between the network device and the terminal device, communication and transmission on an interfering beam corresponding to an interference measurement resource that causes strong interference to the first channel measurement resource are avoided. This improves performance of communication and transmission. The network device obtains the first signal to interference plus noise ratios respectively corresponding to the K interference measurement resource sets, so that the network device can select a correct modulation and coding parameter to perform data transmission with the terminal device.

FIG. 6 is a schematic diagram of another embodiment of a resource measurement method according to an embodiment of this application. As shown in FIG. 6, the method includes the following steps.

601: A terminal device determines a second signal to interference plus noise ratio based on a first channel measurement resource and M interference measurement resource sets.

Measurement results for K interference measurement resource sets include the second signal to interference plus noise ratio and/or indexes of the K interference measurement resource sets. K is equal to M, and the K interference measurement resource sets are the M interference measurement resource sets.

The second signal to interference plus noise ratio is a signal to interference plus noise ratio of the first channel measurement resource that is determined by using the M interference measurement resource sets as interference. To be specific, the second signal to interference plus noise ratio is a signal to interference plus noise ratio determined by the terminal device based on the first channel measurement resource and the M interference measurement resource sets, and is used to represent degrees of interference caused by the M interference measurement resource sets to the first channel measurement resource.

In some implementations, step 601 may include step 601*a*.

601*a*: The terminal device determines the second signal to interference plus noise ratio based on signal strength of the first channel measurement resource and average signal strength respectively corresponding to the M interference measurement resource sets.

Specifically, the terminal device measures the first channel measurement resource to obtain the signal strength of the first channel measurement resource. The terminal device determines the average signal strength respectively corresponding to the M interference measurement resource sets. For a manner of determining the average signal strength respectively corresponding to the M interference measurement resource sets, refer to related descriptions in the embodiment shown in steps 301*a* and 301*b* or steps 301*c* to 301*e*. Details are not described herein again. Then the terminal device determines the second signal to interference plus noise ratio based on the signal strength of the first channel measurement resource and the average signal strength respectively corresponding to the M interference measurement resource sets. To be specific, the second signal to interference plus noise ratio is a signal to interference plus noise ratio of the first channel measurement resource that is calculated by using the average signal strength respectively corresponding to the M interference measurement resource sets as interference.

In a possible implementation, step 601*a* may include: The terminal device determines the second signal to interference plus noise ratio based on the signal strength of the first channel measurement resource and first interference signal strength.

The first interference signal strength is a sum of the average signal strength respectively corresponding to the M interference measurement resource sets, or the first interference signal strength is an average value of the average signal strength respectively corresponding to the M interference measurement resource sets.

For example, the M interference measurement resource sets include two interference measurement resource sets: an interference measurement resource set 1 and an interference measurement resource set 2. Average signal strength of the interference measurement resource set 1 is a, and average signal strength of the interference measurement resource set 2 is b. In this case, a sum of the average signal strength respectively corresponding to the two interference measurement resource sets is a+b. The signal strength of the first channel measurement resource is P, and signal strength of noise is N. Therefore, the terminal device may determine a second signal to interference plus noise ratio SINR2, where $SINR2=P/(a+b+N)$.

For example, the M interference measurement resource sets include two interference measurement resource sets: an interference measurement resource set 1 and an interference measurement resource set 2. Average signal strength of the interference measurement resource set 1 is a, and average signal strength of the interference measurement resource set 2 is b. An average value of the average signal strength respectively corresponding to the two interference measurement resource sets is (a+b)/2. The signal strength of the first channel measurement resource is P, and signal strength of noise is N. Therefore, the terminal device may determine a second signal to interference plus noise ratio SINR3, where $SINR3=P/((a+b)/2+N)$.

It can be learned from the technical solution of the embodiment shown in FIG. 6 that the terminal device determines the second signal to interference plus noise ratio based on the first channel measurement resource and the M interference measurement resource sets. The second signal to interference plus noise ratio is a signal to interference plus noise ratio of the first channel measurement resource that is determined by using the M interference measurement resource sets as interference. Compared with a technical solution in which only one corresponding interference measurement resource is configured for each channel measurement resource and an interference status of only one interference measurement resource can be measured at a time, in the foregoing solution, measurement or reporting does not need to be performed a plurality of times. This reduces a measurement delay and reduces measurement reporting overheads. The network device obtains the second signal to interference plus noise ratio, so that the network device can select a correct modulation and coding parameter to perform data transmission with the terminal device.

FIG. 7 is a schematic diagram of another embodiment of a resource measurement method according to an embodiment of this application. As shown in FIG. 7, the method includes the following steps.

701: A terminal device determines K interference measurement resource sets from M interference measurement resource sets, where K is less than M.

There are a plurality of manners of determining, by the terminal device, the K interference measurement resource sets from the M interference measurement resource sets in step 701. The following describes two possible implementations.

The following describes an implementation 1 with reference to step 701*a*.

701*a*: The terminal device receives indication information from a network device.

The indication information indicates the K interference measurement resource sets.

Based on step 701*a*, step 701 may include: The terminal device determines the K interference measurement resource sets based on the indication information.

The following describes an implementation 2 with reference to step 701*b* and step 701*c*.

701*b*: The terminal device determines average signal strength of each of the M interference measurement resource sets.

The average signal strength of each interference measurement resource set is an average value of signal strength of all interference measurement resources included in the interference measurement resource set.

There are a plurality of manners of determining average signal strength respectively corresponding to the M interference measurement resource sets. For a manner of determining the average signal strength respectively corresponding to the M interference measurement resource sets, refer to related descriptions in the embodiment shown in steps 301*a* and 301*b* or steps 301*c* to 301*e*. Details are not described herein again.

701*c*: The terminal device determines the K interference measurement resource sets from the M interference measurement resource sets based on the average signal strength of each of the M interference measurement resource sets.

In a possible implementation, the K interference measurement resource sets include:

- K interference measurement resource sets with highest average signal strength among the M interference measurement resource sets; or
- K interference measurement resource sets with lowest average signal strength among the M interference measurement resource sets; or
- K interference measurement resource sets whose average signal strength is greater than a first threshold among the M interference measurement resource sets; or
- K interference measurement resource sets whose average signal strength is less than the first threshold among the M interference measurement resource sets.

For related descriptions of the first threshold, refer to related descriptions in the embodiment shown in FIG. 3. Details are not described herein again.

In step 701*c*, the terminal device may select the K interference measurement resource sets based on the average signal strength respectively corresponding to the M interference measurement resources. For a specific implementation of the K interference measurement resource sets, refer to the foregoing descriptions.

Therefore, the terminal device reports, to the network device, measurement results for the K interference measurement resource sets with the highest or lowest average signal strength, or reports measurement results for the K interference measurement resource sets whose average signal strength is greater than the first threshold or less than the first threshold. Therefore, during communication and transmission between the network device performs and the terminal device, the network device can avoid performing communication and transmission with another terminal device on an interfering beam that causes strong interference to the terminal device. This improves performance of communication and transmission.

702: The terminal device determines a third signal to interference plus noise ratio based on a first channel measurement resource and the K interference measurement resource sets.

Measurement results for the K interference measurement resource sets include the third signal to interference plus noise ratio and/or indexes of the K interference measurement resource sets.

The third signal to interference plus noise ratio is a signal to interference plus noise ratio of the first channel measurement resource that is determined by using the K interference measurement resource sets as interference. To be specific, the third signal to interference plus noise ratio is a signal to interference plus noise ratio determined by the terminal device based on the first channel measurement resource and the K interference measurement resource sets, and is used to represent degrees of interference caused by the K interference measurement resource sets to the first channel measurement resource.

Optionally, step 702 may include 702*a*.

702*a*: The terminal device determines the third signal to interference plus noise ratio based on signal strength of the first channel measurement resource and average signal strength respectively corresponding to the K interference measurement resource sets.

Step 702*a* is similar to step 601*a* in the embodiment shown in FIG. 6. For details, refer to related descriptions of step 601*a* in the embodiment shown in FIG. 6. Details are not described herein again.

It can be learned from the technical solution of the embodiment shown in FIG. 7 that the terminal device determines the third signal to interference plus noise ratio based on the first channel measurement resource and the M interference measurement resource sets. The third signal to interference plus noise ratio is a signal to interference plus noise ratio of the first channel measurement resource that is determined by using the K interference measurement resource sets as interference. The measurement results for the K interference measurement resource sets include the third signal to interference plus noise ratio and/or the indexes of the K interference measurement resource sets. In this way, the network device can perform communication and transmission based on a status of interference caused by an interference measurement resource to the first channel measurement resource. For example, during transmission between the network device and the terminal device, communication and transmission on an interfering beam corresponding to an interference measurement resource that causes strong interference to the first channel measurement resource are avoided. This improves performance of communication and transmission. The network device may obtain the third signal to interference plus noise ratio, so that the network device can select a correct modulation and coding parameter to perform data transmission with the terminal device.

In the embodiments shown in FIG. 2 to FIG. 7, technical solutions of this application are described by using measurement and reporting processes for the first channel measurement resource and the M measurement resource sets configured by the network device for the terminal device as an example. If the network device configures a plurality of channel measurement resources for the terminal device, technical solutions of this application are also applicable to measurement and reporting processes for another channel measurement resource and M measurement resource sets corresponding to the another channel measurement resource. For example, the configuration information further includes a second channel measurement resource and M interference measurement resources corresponding to the second channel measurement resource. Measurement and reporting processes for the second channel measurement resource and the M interference measurement resources corresponding to the second channel measurement resource are similar to those in the embodiment shown in FIG. 2. Specifically, the terminal device separately measures the first channel measurement resource and the second channel measurement resource according to the foregoing method, and reports related measurement results. Alternatively, the terminal device may report a channel measurement result corresponding only to one or more of the channel measurement resources.

The following describes a communication apparatus provided in embodiments of this application. FIG. 8 is a schematic diagram of a structure of a communication apparatus according to an embodiment of this application. The communication apparatus 800 may be configured to perform the steps performed by the terminal device in the embodiments shown in FIG. 2 to FIG. 7. For details, refer to related descriptions in the foregoing method embodiments.

The communication apparatus 800 includes a transceiver module 801 and a processing module 802. The transceiver module 801 may implement a corresponding communication function, and the processing module 802 is configured to process data. The transceiver module 801 may also be referred to as a communication interface or a communication unit.

Optionally, the communication apparatus 800 may further include a storage unit. The storage unit may be configured to store instructions and/or data. The processing module 802 may read the instructions and/or the data in the storage unit, so that the communication apparatus implements the foregoing method embodiments.

The communication apparatus 800 may be configured to perform an action performed by the terminal device in the foregoing method embodiments. The communication apparatus 800 may be a terminal device or a component that can be configured in a terminal device. The transceiver module 801 is configured to perform a sending/receiving-related operation on the terminal device side in the foregoing method embodiments, and the processing module 802 is configured to perform a processing-related operation on the terminal device side in the foregoing method embodiments.

Optionally, the transceiver module 801 may include a sending module and a receiving module. The sending module is configured to perform a sending operation in the foregoing method embodiments. The receiving module is configured to perform a receiving operation in the foregoing method embodiments.

It should be noted that the communication apparatus 800 may include a sending module but not a receiving module, or the communication apparatus 800 may include a receiving module but not a sending module. This may be determined based on whether the foregoing solution performed by the communication apparatus 800 includes a sending action and a receiving action.

In an example, the communication apparatus 800 is configured to perform an action performed by the terminal device in the embodiment shown in FIG. 2.

The transceiver module 801 receives configuration information from a network device, where the configuration information includes M measurement resource sets, each measurement resource set includes one or more measurement resources, and M is an integer greater than or equal to 1.

The processing module 802 is configured to measure measurement resources in the M measurement resource sets based on the configuration information, and determine measurement results for K measurement resource sets of the M measurement resource sets, where K is an integer greater than or equal to 1 and less than or equal to M.

The transceiver module 801 is configured to report the measurement results for the K measurement resource sets to the network device.

Optionally, the transceiver module 801 is further configured to perform step 201*a* in the embodiment shown in FIG. 2.

In an example, the communication apparatus 800 is configured to perform an action performed by the terminal device in the embodiment shown in FIG. 3. The processing module 802 is configured to perform step 301 and step 302 in the embodiment shown in FIG. 3.

In an example, the communication apparatus 800 is configured to perform an action performed by the terminal device in the embodiment shown in FIG. 4. The processing module 802 is configured to perform step 401 in the embodiment shown in FIG. 4.

In an example, the communication apparatus 800 is configured to perform an action performed by the terminal device in the embodiment shown in FIG. 5. The processing module 802 is configured to perform step 501 and step 502 in the embodiment shown in FIG. 5.

In an example, the communication apparatus 800 is configured to perform an action performed by the terminal device in the embodiment shown in FIG. 6. The processing module 802 is configured to perform step 601 in the embodiment shown in FIG. 6.

In an example, the communication apparatus 800 is configured to perform an action performed by the terminal device in the embodiment shown in FIG. 7. The processing module 802 is configured to perform step 701 and step 702 in the embodiment shown in FIG. 7.

It should be understood that specific processes of performing the foregoing corresponding steps by the modules are described in detail in the foregoing method embodiments. For brevity, details are not described herein again.

The processing module 802 in the foregoing embodiment may be implemented by at least one processor or a processor-related circuit. The transceiver module 801 may be implemented by a transceiver or a transceiver-related circuit. The transceiver module 801 may also be referred to as a communication unit or a communication interface. The storage unit may be implemented by at least one memory.

The following describes a communication apparatus provided in embodiments of this application. FIG. 9 is a schematic diagram of a structure of a communication apparatus according to an embodiment of this application. The communication apparatus 900 may be configured to perform the steps performed by the network device in the embodiment shown in FIG. 2. For details, refer to related descriptions in the foregoing method embodiments.

The communication apparatus 900 includes a transceiver module 901. Optionally, the communication apparatus 900 further includes a processing module 902. The transceiver module 901 may implement a corresponding communication function, and the processing module 902 is configured to process data. The transceiver module 901 may also be referred to as a communication interface or a communication unit.

The communication apparatus 900 may be configured to perform an action performed by the terminal device in the foregoing method embodiments. The communication apparatus 900 may be a network device or a component that can be configured in a network device. The transceiver module 901 is configured to perform a sending/receiving-related operation on a network device side in the foregoing method embodiments.

Optionally, the transceiver module 901 may include a sending module and a receiving module. The sending module is configured to perform a sending operation in the foregoing method embodiments. The receiving module is configured to perform a receiving operation in the foregoing method embodiments.

It should be noted that the communication apparatus 900 may include a sending module but not a receiving module, or the communication apparatus 900 may include a receiving module but not a sending module. This may be determined based on whether the foregoing solution performed by the communication apparatus 900 includes a sending action and a receiving action.

In an example, the communication apparatus 900 is configured to perform an action performed by the network device in the embodiment shown in FIG. 2.

The transceiver module 801 is configured to: send configuration information to a terminal device, where the configuration information includes M measurement resource sets, each measurement resource set includes one or more measurement resources, and M is an integer greater than or equal to 1; and receive measurement results for K measurement resource sets of the M measurement resource sets from the terminal device, where the measurement results for the K measurement resource sets are determined by the terminal device based on the configuration information, and K is an integer greater than or equal to 1 and less than or equal to M.

Optionally, the transceiver module 901 is further configured to perform step 201*a* in the embodiment shown in FIG. 2.

It should be understood that specific processes of performing the foregoing corresponding steps by the modules are described in detail in the foregoing method embodiments. For brevity, details are not described herein again.

The processing module 902 in the foregoing embodiment may be implemented by at least one processor or a processor-related circuit. The transceiver module 901 may be implemented by a transceiver or a transceiver-related circuit. The transceiver module 901 may also be referred to as a communication unit or a communication interface. The storage unit may be implemented by at least one memory.

An embodiment of this application further provides a communication apparatus 1000. The communication apparatus 1000 includes a processor 1010. The processor 1010 is coupled to a memory 1020. The memory 1020 is configured to store a computer program or instructions and/or data. The processor 1010 is configured to execute the computer program or instructions and/or the data stored in the memory 1020, so that the methods in the foregoing method embodiments are performed.

Optionally, the communication apparatus 1000 includes one or more processors 1010.

Figure 10:
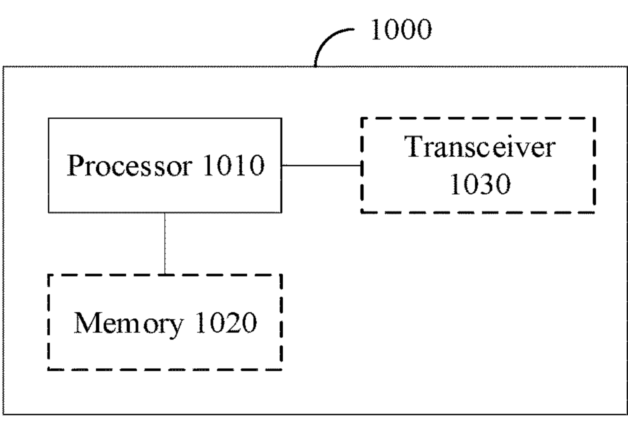
FIG. 10 is a schematic diagram of another structure of a communication apparatus according to an embodiment of this application.

Optionally, as shown in FIG. 10, the communication apparatus 1000 may further include the memory 1020.

Optionally, the communication apparatus 1000 includes one or more memories 1020.

Optionally, the memory 1020 may be integrated with the processor 1010, or the memory 1020 and the processor 1010 are disposed separately.

Optionally, as shown in FIG. 10, the communication apparatus 1000 may further include a transceiver 1030, and the transceiver 1030 is configured to send and/or receive a signal. For example, the processor 1010 is configured to control the transceiver 1030 to send and/or receive a signal.

In a solution, the communication apparatus 1000 is configured to implement an operation performed by the terminal device in the foregoing method embodiments.

For example, the processor 1010 is configured to implement a processing-related operation performed by the terminal device in the foregoing method embodiments, and the transceiver 1030 is configured to implement a sending/receiving-related operation performed by the terminal device in the foregoing method embodiments.

In another solution, the communication apparatus 1000 is configured to implement an operation performed by the network device in the foregoing method embodiments.

For example, the processor 1010 is configured to implement a processing-related operation performed by the network device in the foregoing method embodiments, and the transceiver 1030 is configured to implement a sending/receiving-related operation performed by the network device in the foregoing method embodiments.

An embodiment of this application further provides a communication apparatus 1100. The communication apparatus 1100 may be a terminal device or a chip. The communication apparatus 1100 may be configured to perform an operation performed by the terminal device in the foregoing method embodiments.

Figure 11:
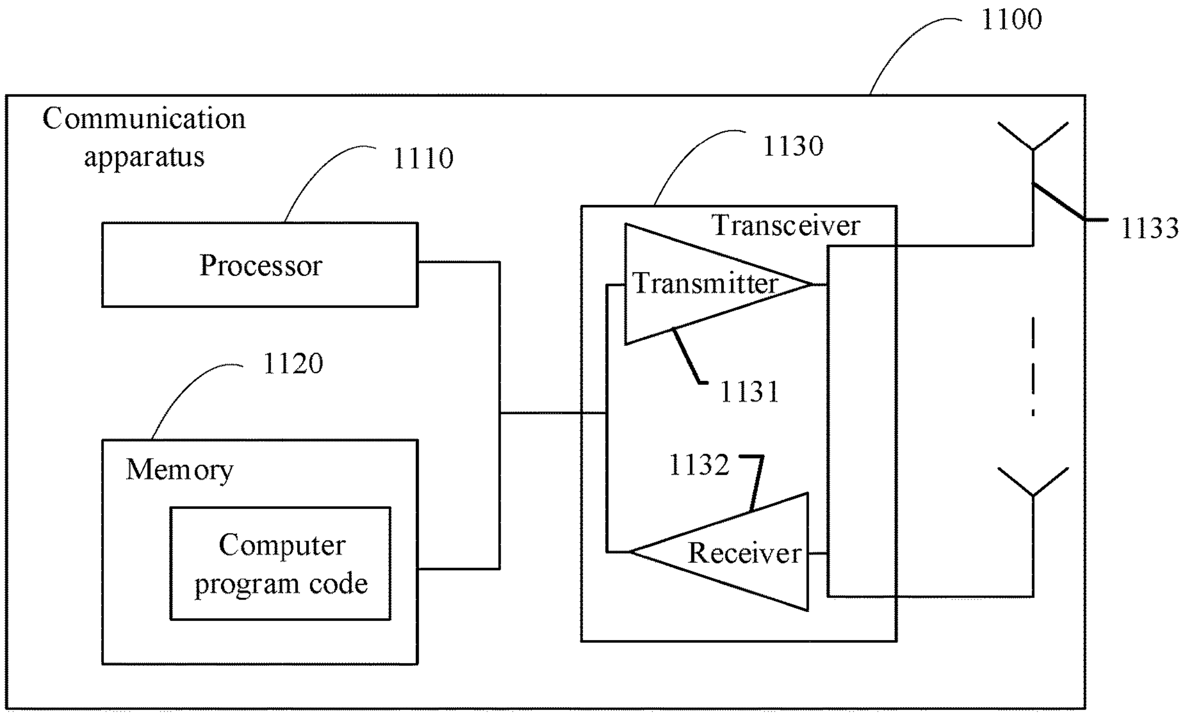
FIG. 11 is a schematic diagram of another structure of a communication apparatus according to an embodiment of this application.

When the communication apparatus 1100 is a terminal device, FIG. 11 is a simplified schematic diagram of a structure of a terminal device. As shown in FIG. 11, the terminal device includes a processor, a memory, and a transceiver. The memory may store computer program code. The transceiver includes a transmitter 1131, a receiver 1132, a radio frequency circuit (not shown in the figure), an antenna 1133, and an input/output apparatus (not shown in the figure). The processor is mainly configured to process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal and process the radio frequency signal. The antenna is mainly configured to send/receive a radio frequency signal in a form of an electromagnetic wave. The input/output apparatus, for example, a touchscreen, a display, or a keyboard, is mainly configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data. For ease of description, FIG. 11 shows only one memory, one processor, and one transceiver. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal device, and the processor that has a processing function may be considered as a processing unit of the terminal device.

As shown in FIG. 11, the terminal device includes a processor 1110, a memory 1120, and a transceiver 1130. The processor 1110 may also be referred to as a processing unit, a processing board, a processing module, a processing apparatus, or the like. The transceiver 1130 may also be referred to as a transceiver unit, a transceiver device, a transceiver apparatus, or the like.

Optionally, a component for implementing a receiving function in the transceiver 1130 may be considered as a receiving unit, and a component for implementing a sending function in the transceiver 1130 may be considered as a sending unit. That is, the transceiver 1130 includes a receiver and a transmitter. The transceiver sometimes may also be referred to as a transceiver device, a transceiver unit, a transceiver circuit, or the like. The receiver sometimes may also be referred to as a receiving device, a receiving unit, a receiver circuit, or the like. The transmitter sometimes may also be referred to as a transmitting device, a transmitting unit, a transmitter circuit, or the like.

For example, in an implementation, the processor 1110 is configured to perform a processing action on the terminal device side in the embodiment shown in FIG. 2, and the transceiver 1130 is configured to perform a sending/receiving action on the terminal device side in FIG. 2. For example, the transceiver 1130 is configured to perform the sending and receiving operations in step 201 and step 203 in the embodiment shown in FIG. 2, and the processor 1110 is configured to perform the processing operation in step 202 in the embodiment shown in FIG. 2. Optionally, the transceiver 1130 is further configured to perform the sending and receiving operations in step 201*a* in the embodiment shown in FIG. 2.

For example, in an implementation, the processor 1110 is configured to perform a processing action on the terminal device side in the embodiment shown in FIG. 3. The processor 1110 is configured to perform the processing operations in step 301 and step 302 in the embodiment shown in FIG. 3.

For example, in an implementation, the processor 1110 is configured to perform a processing action on the terminal device side in the embodiment shown in FIG. 4. The processor 1110 is configured to perform the processing operation in step 401 in the embodiment shown in FIG. 4.

For example, in an implementation, the processor 1110 is configured to perform a processing action on the terminal device side in the embodiment shown in FIG. 5. The processor 1110 is configured to perform the processing operations in step 501 and step 502 in the embodiment shown in FIG. 5.

For example, in an implementation, the processor 1110 is configured to perform a processing action on the terminal device side in the embodiment shown in FIG. 6. The processor 1110 is configured to perform the processing operation in step 601 in the embodiment shown in FIG. 6.

For example, in an implementation, the processor 1110 is configured to perform a processing action on the terminal device side in the embodiment shown in FIG. 7. The processor 1110 is configured to perform the processing operations in step 701 and step 702 in the embodiment shown in FIG. 7.

It should be understood that FIG. 11 is merely an example but not a limitation, and the terminal device including the transceiver unit and the processing unit may not rely on the structure shown in FIG. 11.

When the communication apparatus 1100 is a chip, the chip includes a processor, a memory, and a transceiver. The transceiver may be an input/output circuit or a communication interface. The processor may be a processing unit, a microprocessor, or an integrated circuit that is integrated on the chip. The sending operation performed by the terminal device in the foregoing method embodiments may be understood as output by the chip. The receiving operation performed by the terminal device in the foregoing method embodiments may be understood as input for the chip.

An embodiment of this application further provides a communication apparatus 1200. The communication apparatus 1200 may be a network device or a chip. The communication apparatus 1200 may be configured to perform an operation performed by the network device in the foregoing method embodiments.

Figure 12:
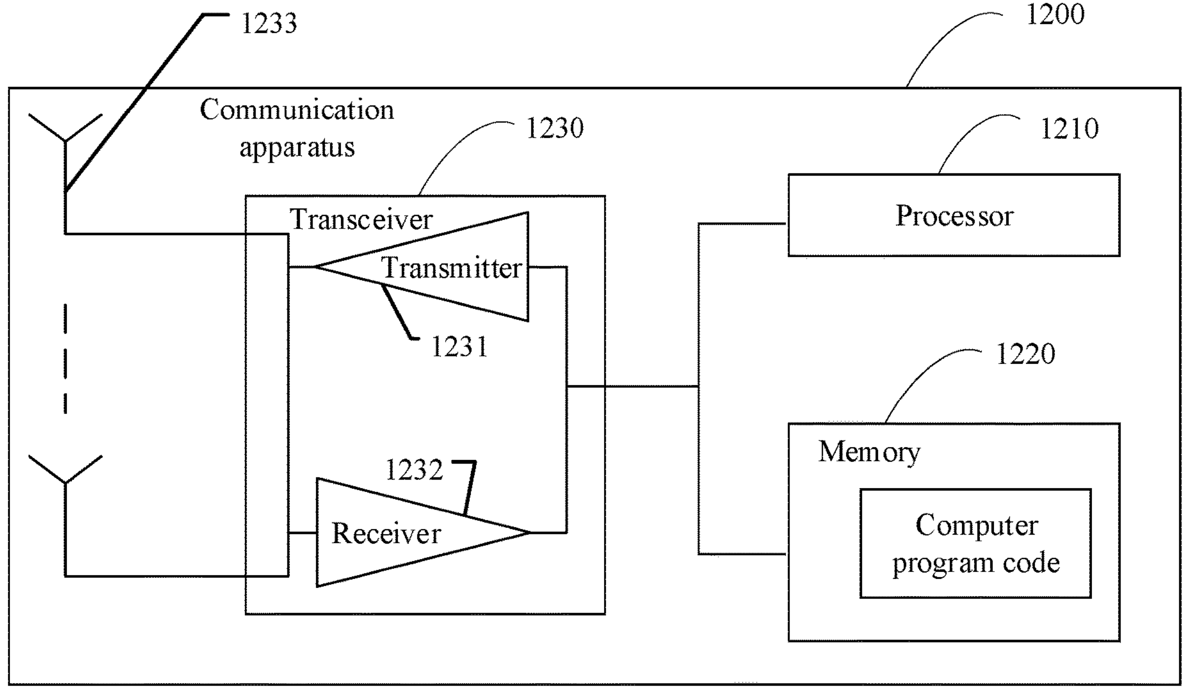
FIG. 12 is a schematic diagram of another structure of a communication apparatus according to an embodiment of this application.

When the communication apparatus 1200 is a network device, for example, a base station, FIG. 12 is a simplified schematic diagram of a structure of a base station. The base station includes a part 1210, a part 1220, and a part 1230. The part 1210 is mainly configured to perform baseband processing, control the base station, and the like. The part 1210 is usually a control center of the base station, and may be usually referred to as a processor, and is configured to control the base station to perform a processing operation on the network device side in the foregoing method embodiments. The part 1220 is mainly configured to store computer program code and data. The part 1230 is mainly configured to send or receive a radio frequency signal and perform conversion between a radio frequency signal and a baseband signal. The part 1230 may be usually referred to as a transceiver unit, a transceiver device, a transceiver circuit, a transceiver, or the like. The transceiver unit in the part 1230 may also be referred to as a transceiver device, a transceiver, or the like, and includes an antenna 1233 and a radio frequency circuit (not shown in the figure). The radio frequency circuit is mainly configured to perform radio frequency processing. Optionally, a component for implementing a receiving function in the part 1230 may be considered as a receiver, and a component for implementing a sending function may be considered as a transmitter. That is, the part 1230 includes a receiver 1232 and a transmitter 1231. The receiver may also be referred to as a receiving unit, a receiving device, a receiver circuit, or the like. The transmitter may be referred to as a transmitting unit, a transmitting device, a transmitter circuit, or the like.

The part 1210 and the part 1220 may include one or more boards, and each board may include one or more processors and one or more memories. The processor is configured to read and execute a program in the memory, to implement a baseband processing function and control the base station. If there are a plurality of boards, the boards may be connected to each other to enhance a processing capability. In an optional implementation, a plurality of boards may share one or more processors, a plurality of boards may share one or more memories, or a plurality of boards may share one or more processors and one or more memories.

For example, in an implementation, the transceiver unit in the part 1230 is configured to perform a sending/receiving-related step performed by the network device in the embodiment shown in FIG. 2, and the processor in the part 1210 is configured to perform a processing-related step performed by the network device in the embodiment shown in FIG. 2.

It should be understood that FIG. 12 is merely an example but not a limitation, and the network device including the processor, the memory, and the transceiver may not relay on the structure shown in FIG. 12.

When the communication apparatus 1200 is a chip, the chip includes a transceiver, a memory, and a processor. The transceiver may be an input/output circuit or a communication interface. The processor may be a processor, a microprocessor, or an integrated circuit that is integrated on the chip. The sending operation performed by the network device in the foregoing method embodiments may be understood as output by the chip. The receiving operation performed by the network device in the foregoing method embodiments may be understood as input for the chip.

An embodiment of this application further provides a computer-readable storage medium. The computer-readable storage medium stores computer instructions for implementing the method performed by the terminal device or the method performed by the network device in the foregoing method embodiments.

For example, when the computer instructions are executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the network device and the terminal device in the foregoing embodiments.

An embodiment of this application further provides a chip apparatus, including a processor, configured to invoke a computer program or computer instructions stored in a memory, so that the processor performs the resource measurement method in the embodiments shown in FIG. 2 to FIG. 7.

In a possible implementation, input for the chip apparatus corresponds to the receiving operation in the embodiments shown in FIG. 2 to FIG. 7, and output of the chip apparatus corresponds to the sending operation in the embodiments shown in FIG. 2 to FIG. 7.

Optionally, the processor is coupled to the memory through an interface.

Optionally, the chip apparatus further includes a memory, and the memory stores a computer program or computer instructions.

Any aforementioned processor may be a general-purpose central processing unit (CPU), a microprocessor, an application-specific integrated circuit (ASIC), or one or more integrated circuits for controlling execution of programs for the resource measurement method in the embodiments shown in FIG. 2 to FIG. 7. Any aforementioned memory may be a read-only memory (ROM), another type of static storage device capable of storing static information and instructions, a random access memory (RAM), or the like.

It can be clearly understood by persons skilled in the art that, for ease and brevity of description, for explanations and beneficial effect of related content for any communication apparatus provided above, reference may be made to a corresponding method embodiment provided above. Details are not described herein again.

In embodiments of this application, the terminal device or the network device may include a hardware layer, an operating system layer running at the hardware layer, and an application layer running at the operating system layer. The hardware layer may include hardware such as a CPU, a memory management unit (MMU), and a memory (also referred to as a main memory). An operating system at the operating system layer may be any one or more computer operating systems that implement service processing through a process (process), for example, a Linux operating system, a Unix operating system, an Android operating system, an iOS operating system, or a Windows operating system. The application layer may include applications such as a browser, an address book, word processing software, and instant messaging software.

It can be clearly understood by persons skilled in the art that, for ease and brevity of description, for detailed operating processes of the foregoing system, apparatus, and unit, reference may be made to corresponding processes in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or a part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk, a read-only memory, a random access memory, a magnetic disk, or an optical disc.

The foregoing embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A resource measurement method, comprising:

receiving, by a terminal device, configuration information from a network device, wherein the configuration information comprises M measurement resource sets, each measurement resource set comprises one or more measurement resources, and M is an integer greater than or equal to 1;

measuring, by the terminal device, measurement resources in the M measurement resource sets based on the configuration information, to determine average signal strength of each of the M measurement resource sets, wherein the average signal strength of each measurement resource set is an average value of signal strength of all measurement resources included in the measurement resource set;

determining, by the terminal device, measurement results for K measurement resource sets of the M measurement resource sets based on the average signal strength of each of the M measurement resource sets, wherein K is an integer greater than or equal to 1 and less than or equal to M, wherein the measurement results for the K measurement resource sets comprise indexes of the K measurement resource sets and/or average signal strength respectively corresponding to the K measurement resource sets; and reporting, by the terminal device, the measurement results for the K measurement resource sets to the network device.

2. The method of claim 1, wherein if at least one of the measurement resources included in the M measurement resource sets comprises a plurality of antenna ports, signal strength of the at least one measurement resource is an average value of signal strength corresponding to the plurality of antenna ports; or signal strength of the at least one measurement resource is a sum of signal strength corresponding to the plurality of antenna ports.

3. The method of claim 1, wherein the K measurement resource sets comprise:

K measurement resource sets with highest average signal strength among the M measurement resource sets;

K measurement resource sets with lowest average signal strength among the M measurement resource sets;

K measurement resource sets whose average signal strength is greater than a first threshold among the M measurement resource sets; or K measurement resource sets whose average signal strength is less than the first threshold among the M measurement resource sets.

4. The method of claim 1, wherein the configuration information further comprises a channel measurement resource, the M measurement resource sets are M interference measurement resource sets, each interference measurement resource set comprises one or more interference measurement resources, and the measurement results for the K measurement resource sets are measurement results for K interference measurement resource sets; and wherein the determining, by the terminal device, the measurement results for K measurement resource sets of the M measurement resource sets comprises:

determining, by the terminal device, the measurement results for the K interference measurement resource sets based on the channel measurement resource and the M interference measurement resource sets.

5. The method of claim 4, wherein the determining, by the terminal device, the measurement results for the K interference measurement resource sets based on the channel measurement resource and the M interference measurement resource sets comprises:

determining, by the terminal device, M first signal to interference plus noise ratios based on the channel measurement resource and the M interference measurement resource sets, wherein the M first signal to interference plus noise ratios correspond to the M interference measurement resource sets, an ith first signal to interference plus noise ratio of the M first signal to interference plus noise ratios is a signal to interference plus noise ratio of the channel measurement resource that is determined by using an ith interference measurement resource set of the M interference measurement resource sets as interference, and i is an integer greater than or equal to 1 and less than or equal to M; and determining, by the terminal device, the measurement results for the K interference measurement resource sets based on the M first signal to interference plus noise ratios, wherein the measurement results for the K interference measurement resource sets comprise indexes of the K interference measurement resource sets and/or first signal to interference plus noise ratios respectively corresponding to the K interference measurement resource sets.

6. The method of claim 5, wherein the ith first signal to interference plus noise ratio is a signal to interference plus noise ratio of the channel measurement resource that is determined by using average signal strength of the ith interference measurement resource set as interference; and the average signal strength of the ith interference measurement resource set is an average value of signal strength of all interference measurement resources included in the ith interference measurement resource set.

7. The method of claim 6, wherein if at least one of the interference measurement resources included in the ith interference measurement resource set comprises a plurality of antenna ports, signal strength of the at least one interference measurement resource is an average value of signal strength corresponding to the plurality of antenna ports; or signal strength of the at least one interference measurement resource is a sum of signal strength corresponding to the plurality of antenna ports.

8. The method of claim 5, wherein the K interference measurement resource sets comprise:

K interference measurement resource sets corresponding to a largest first signal to interference plus noise ratio among the M interference measurement resource sets;

K interference measurement resource sets corresponding to a smallest first signal to interference plus noise ratio among the M interference measurement resource sets;

an interference measurement resource set corresponding to a first signal to interference plus noise ratio greater than a second threshold among the M interference measurement resource sets; or an interference measurement resource set corresponding to a first signal to interference plus noise ratio less than the second threshold among the M interference measurement resource sets.

9. The method of claim 4, wherein K is equal to M, the K interference measurement resource sets are the M interference measurement resource sets, and the determining, by the terminal device, the measurement results for the K interference measurement resource sets based on the channel measurement resource and the M interference measurement resource sets comprises:

determining, by the terminal device, a second signal to interference plus noise ratio based on the channel measurement resource and the M interference measurement resource sets, wherein the second signal to interference plus noise ratio is a signal to interference plus noise ratio of the channel measurement resource that is determined by using the M interference measurement resource sets as interference, and the measurement results for the K interference measurement resource sets comprise the second signal to interference plus noise ratio and/or indexes of the M interference measurement resource sets.

10. The method of claim 9, wherein the determining, by the terminal device, the second signal to interference plus noise ratio based on the channel measurement resource and the M interference measurement resource sets comprises:

determining, by the terminal device, the second signal to interference plus noise ratio based on signal strength of the channel measurement resource and average signal strength respectively corresponding to the M interference measurement resource sets, wherein average signal strength of each of the M interference measurement resource sets is an average value of signal strength of all interference measurement resources included in the interference measurement resource set.

11. The method of claim 10, wherein the determining, by the terminal device, the second signal to interference plus noise ratio based on signal strength of the channel measurement resource and average signal strength respectively corresponding to the M interference measurement resource sets comprises:

determining, by the terminal device, the second signal to interference plus noise ratio based on the signal strength of the channel measurement resource and first interference signal strength, wherein the first interference signal strength is a sum of the average signal strength respectively corresponding to the M interference measurement resource sets, or the first interference signal strength is an average value of the average signal strength respectively corresponding to the M interference measurement resource sets.

12. The method of claim 4, wherein K is less than M, and the M interference measurement resource sets comprise the K interference measurement resource sets; and wherein the determining, by the terminal device, the measurement results for the K interference measurement resource sets based on the channel measurement resource and the M interference measurement resource sets comprises:

determining, by the terminal device, the K interference measurement resource sets from the M interference signal resource sets; and determining, by the terminal device, a third signal to interference plus noise ratio based on the channel measurement resource and the K interference measurement resource sets, wherein the third signal to interference plus noise ratio is a signal to interference plus noise ratio of the channel measurement resource that is determined by using the K interference measurement resource sets as interference, and the measurement results for the K interference measurement resource sets comprise the third signal to interference plus noise ratio and/or indexes of the K interference measurement resource sets.

13. The method of claim 12, wherein the determining, by the terminal device, the K interference measurement resource sets from the M interference signal resource sets comprises:

receiving, by the terminal device, indication information from the network device, wherein the indication information indicates the K interference measurement resource sets.

14. The method of claim 12, wherein the determining, by the terminal device, the K interference measurement resource sets from the M interference signal resource sets comprises:

determining, by the terminal device, average signal strength of each of the M interference measurement resource sets, wherein the average signal strength of each interference measurement resource set is an average value of signal strength of all interference measurement resources included in the interference measurement resource set; and determining, by the terminal device, the K interference measurement resource sets based on the average signal strength of each of the M interference measurement resource sets.

15. The method of claim 12, wherein the determining, by the terminal device, the third signal to interference plus noise ratio based on the channel measurement resource and the K interference measurement resource sets comprises:

determining, by the terminal device, the third signal to interference plus noise ratio based on signal strength of the channel measurement resource and average signal strength respectively corresponding to the K interference measurement resource sets, wherein average signal strength of each of the K interference measurement resource sets is an average value of signal strength of all interference measurement resources included in the interference measurement resource set.

16. The method of claim 15, wherein the determining, by the terminal device, the third signal to interference plus noise ratio based on signal strength of the channel measurement resource and average signal strength respectively corresponding to the K interference measurement resource sets comprises:

determining, by the terminal device, the third signal to interference plus noise ratio based on the signal strength of the channel measurement resource and second interference signal strength, wherein the second interference signal strength is a sum of the average signal strength respectively corresponding to the K interference measurement resource sets, or the second interference signal strength is an average value of the average signal strength respectively corresponding to the K interference measurement resource sets.

17. The method of claim 12, wherein all interference measurement resources in a same interference measurement resource set of the K interference measurement resource sets each comprise a same quantity of antenna ports.

18. The method of claim 1, the method further comprising:

reporting, by the terminal device, capability information to the network device, wherein the capability information comprises at least one of the following: a quantity of measurement resource sets supported by the terminal device, a quantity of resources included in a measurement resource set supported by the terminal device, or a total quantity of resources included in a plurality of measurement resource sets supported by the terminal device.

19. A communication apparatus, comprising:

a transceiver, configured to receive configuration information from a network device, wherein the configuration information comprises M measurement resource sets, each measurement resource set comprises one or more measurement resources, and M is an integer greater than or equal to 1; and a processor, configured to measure measurement resources in the M measurement resource sets based on the configuration information, to determine average signal strength of each of the M measurement resource sets, wherein the average signal strength of each measurement resource set is an average value of signal strength of all measurement resources included in the measurement resource set; and determine measurement results for K measurement resource sets of the M measurement resource sets based on the average signal strength of each of the M measurement resource sets, wherein K is an integer greater than or equal to 1 and less than or equal to M, wherein the measurement results for the K measurement resource sets comprise indexes of the K measurement resource sets and/or average signal strength respectively corresponding to the K measurement resource sets, and wherein the transceiver is further configured to report the measurement results for the K measurement resource sets to the network device.

20. A non-transitory computer-readable storage medium comprising computer instructions that, when executed by a terminal device, cause the terminal device to perform operations including:

receiving configuration information from a network device, wherein the configuration information comprises M measurement resource sets, each measurement resource set comprises one or more measurement resources, and M is an integer greater than or equal to 1;

measuring measurement resources in the M measurement resource sets based on the configuration information, to determine average signal strength of each of the M measurement resource sets, wherein the average signal strength of each measurement resource set is an average value of signal strength of all measurement resources included in the measurement resource set;

determining measurement results for K measurement resource sets of the M measurement resource sets based on the average signal strength of each of the M measurement resource sets, wherein K is an integer greater than or equal to 1 and less than or equal to M, wherein the measurement results for the K measurement resource sets comprise indexes of the K measurement resource sets and/or average signal strength respectively corresponding to the K measurement resource sets; and reporting the measurement results for the K measurement resource sets to the network device.

* * * * *